US010977743B1

(12) United States Patent
Wang et al.

(10) Patent No.: US 10,977,743 B1
(45) Date of Patent: *Apr. 13, 2021

(54) COMPUTER IMPLEMENTED METHODS SYSTEMS AND ARTICLES OF MANUFACTURE FOR INSTANCE AND SUGGESTION DIFFERENTIATION DURING PREPARATION OF ELECTRONIC TAX RETURN

(71) Applicant: Intuit Inc., Mountain View, CA (US)

(72) Inventors: Gang Wang, San Diego, CA (US); Kevin M. McCluskey, Carlsbad, CA (US); Jennifer L. Keenan, San Diego, CA (US); Rushabh N. Mehta, San Diego, CA (US); Matthew A. Brincho, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 366 days.

This patent is subject to a terminal disclaimer.

(21) Appl. No.: 14/462,315

(22) Filed: Aug. 18, 2014

(51) Int. Cl.
*G06Q 40/00* (2012.01)
*G06F 3/0484* (2013.01)

(52) U.S. Cl.
CPC ....... *G06Q 40/123* (2013.12); *G06F 3/04842* (2013.01)

(58) Field of Classification Search
CPC .......................... G06Q 40/123; G06F 3/04842
(Continued)

(56) References Cited

U.S. PATENT DOCUMENTS 4,213,251 A 7/1980 Foundos
4,809,219 A 2/1989 Ashford et al.
(Continued)

FOREIGN PATENT DOCUMENTS

JP 2002-117121 A 4/2002
JP 2005-190425 A 7/2005
(Continued)

OTHER PUBLICATIONS

Solomon L. Pollack; Analysis of the Decision Rules in Decision Tables, May 1963; The Rand Corooration; pp. iii, iv, 1, 20, & 24 (Year: 1963).*

(Continued)

*Primary Examiner* — Gregory A Pollock
(74) *Attorney, Agent, or Firm* — DLA Piper LLP (US)

(57) ABSTRACT

Computer-implemented methods, systems and articles of manufacture for uniquely identifying instances during preparation of an electronic tax return. A user interface (UI) controller receives inputs related to respective electronic tax return data for the same element of a schema, e.g., different data for two different Form W-2 documents. The UI controller generates different instance identifiers, which are written to a data store with the electronic tax return data. A first instance for the first electronic tax return data is generated from the schema element for Form W-2 and identified by a first instance identifier, and a second instance for the second electronic tax return data is generated from the same schema element and identified by the different, second instance identifier. The instance identifiers are used by a logic agent that generates non-binding suggestions for the UI controller indicating a question nor topic to present to the user.

29 Claims, 18 Drawing Sheets

(58) Field of Classification Search
USPC .......................................................... 705/31
See application file for complete search history.

(56) References Cited

U.S. PATENT DOCUMENTS

| | | |
|---|---|---|
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 2002/0065831 A1 | 5/2002 | DePaolo |
| 2002/0107698 A1 | 8/2002 | Brown et al. |
| 2002/0111888 A1 | 8/2002 | Stanley |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |

(56) References Cited

U.S. PATENT DOCUMENTS

| | | |
|---|---|---|
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendorf et al. |
| 2010/0131394 A1* | 5/2010 | Rutsch .............. G06Q 40/123 705/31 |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari .............. G06F 21/31 705/31 |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).

(56) References Cited

OTHER PUBLICATIONS http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports-graphs-and-snapshots/track-the-earnings-taxes-deductions-or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.

Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Sep. 14, 2017 in U.S. Appl. No. 14/530,159, (41pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).

(56) References Cited

OTHER PUBLICATIONS

PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Sep. 21, 2017 in U.S. Appl. No. 14/448,481, (44pages).
Office Action dated Aug. 25, 2017 in U.S. Appl. No. 14/673,555, (71pages).
Office Action dated Aug. 18, 2017 in U.S. Appl. No. 14/555,543, (42pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Vanderbilt University, "Free tax prep help available for Vanderbilt employees", Feb. 6, 2014, Vanderbilt University, p. 1-3 [NPL-1].
Office Action dated Sep. 28, 2017 in U.S. Appl. No. 14/701,149, (71pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).

(56) References Cited

OTHER PUBLICATIONS

Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).

(56) References Cited

OTHER PUBLICATIONS

Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Communication pursuant to Rules 70(2) and 70a(2) EPC dated Apr. 25, 2018 in European Patent Application No. 16843282.1-1217, (1page).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).

\* cited by examiner

| | A | B | C | D | E | F | G | Goal |
|---|---|---|---|---|---|---|---|---|
| | Y | ? | N | ? | ? | ? | ? | Yes |
| | Y | ? | Y | ? | ? | ? | Y | Yes |
| | N | Y | ? | ? | Y | ? | Y | Yes |
| | N | Y | ? | N | N | N | ? | Yes |
| | N | N | ? | N | ? | N | ? | Yes |

Rows (Rules 461) R₁ - R₅
Columns (Questions 462)
460

FIG. 6

|   | A | B | C | D | E | F | G | Goal |
|---|---|---|---|---|---|---|---|------|
| R1 | Y | ? | N | ? | ? | ? | ? | Yes |
| R2 | Y | ? | Y | ? | ? | ? | Y | Yes |
| R3 | N | Y | ? | ? | Y | N | Y | Yes |
| R4 | N | Y | ? | ? | N | N | ? | Yes |
| R5 | N | N | ? | N | ? | N | ? | Yes |

Rows (Rules 461) · Columns (Questions 462) — 460

Cross Out Since Answer to Question A is "yes"

FIG. 7

COMPUTER IMPLEMENTED METHODS SYSTEMS AND ARTICLES OF MANUFACTURE FOR INSTANCE AND SUGGESTION DIFFERENTIATION DURING PREPARATION OF ELECTRONIC TAX RETURN

SUMMARY

Embodiments are related to uniquely identifying and distinguishing multiple instances, objects or other data structures of or based on the same schema element or term for the same type of electronic tax return data, e.g., for when a user may have a Form W-2 from multiple employers, and distinguishing non-binding suggestions of what to present to a user when suggestions may involve the same tax topic, question or form.

Embodiments are also related to generating instance identifiers that are utilized by or circulated among multiple processing components of a tax return preparation application and eventually circulated back to the source that generated the instance identifier.

Embodiments are also directed to generating instance identifiers before and independently of generation of the instance for which the identifier is generated.

Embodiments are also directed to a source component generating an instance identifier and later receiving question or topic identified or referenced by the same instance identifier that may be presented to the user through an interview screen generated or selected by the source component.

Embodiments are also directed to generating and utilizing instance identifiers within a tax return preparation application in which a logic agent including a rule engine is loosely coupled to a user interface controller, and both of which share a data store to which the user interface controller writes data and from which the logic agent reads data for rule execution and selection of questions or topics to provide to the user interface controller.

Embodiments are also related to using instance identifiers for synchronization of electronic tax return data across different computing devices that are utilized to prepare different portions of an electronic tax return.

One embodiment is directed to a computer-implemented method for identifying different instances of a schema element, term or topic during preparation of an electronic tax return and comprises a user interface (UI) controller receiving first and second inputs related to respective first electronic tax return data and second electronic tax return data for the same element, term or topic of the schema utilized by a data store. For example, the first and second data may be for different Form W-2s for different jobs the user had during the past year. The method further comprises the UI controller generating a first instance identifier and a second instance identifier different than the first instance identifier for respective first and second electronic tax return data and writing the first electronic tax return data and the associated first instance identifier and the second electronic tax return data and the associated second instance identifier to the data store. A first instance for the first electronic tax return is generated from the schema element and identified by the first instance identifier, and a second instance for the second electronic tax return data is generated from the same schema element and identified by the different, second instance identifier. Thus, the data store contains two instances for the same question or topic as defined by the schema (e.g., for multiple Form W-2s), and these instances are uniquely identified for use by other components involved in processing the instance or runtime data.

Other embodiments are directed to systems for identifying different instances of a schema element, term or topic during preparation of an electronic tax return. A system may include a UI controller, or a UI controller and one or more other system components including a logic agent, a calculation engine and a data store shared among the UI controller, logic agent and calculation engine. One embodiment of a system comprises the UI controller, data store and logic agent. The system is structured or configured such that the UI controller can receive inputs related to respective first electronic tax return data and second electronic tax return data for the same element, term or topic of the schema utilized by a data store and generate different instance identifiers for the first and second electronic tax return data. The UI controller is configured or programmed to write the first electronic tax return data and the associated first instance identifier and the second electronic tax return data and the associated second instance identifier to the data store, and the logic agent is configured or programmed to read runtime data including the first instance data and the associated first instance identifier and the second instance data including the second instance identifier from the data store to determine non-binding suggestions for the UI controller based on use of a plurality of rules and runtime or instance data that serve as answers to questions.

Other embodiments are directed to a non-transitory computer-readable medium comprising instructions, which when executed by a processor of a computing device, causes the computing device to execute a process for identifying different instances of a schema element, term or topic during preparation of an electronic tax return. Embodiments may be executed by different types of computing devices including a desktop or laptop computer, a tablet computing device, or a mobile communication device such as a smartphone.

In a single or multiple embodiments, the first and second instances are generated from the same schema element or term involving the same electronic tax form such that first and second instances are generated from the schema for the same type of electronic tax form and are identified by different respective first and second instance identifiers. For example, if a user had multiple jobs, different instance identifiers would be generated and used for different instances for different Form W-2s. As another example, if the user had multiple sources of dividend income, different instance identifiers would be generated and used for different instances for different Form 1099.

In a single or multiple embodiments, the UI controller generates an instance identifier in response to certain predetermined input triggers. An input trigger may be a user's request that is submitted through the user interface controller to enter or import data into an electronic tax form of the electronic tax return, e.g., to direct the user to a particular form so that data can be entered into the form, or to import data from a prior electronic tax return or from an electronic file generated by a financial management system such as QUICKEN, QUICKBOOKS or MINT financial management systems utilized by the user. QUICKEN, QUICKBOOKS and MINT are registered trademarks of Intuit Inc., Mountain View, Calif. Further, the UI controller may generate an instance identifier in response to an input trigger of receiving data from other data resources such as an account the user has with an online social networking site such as linkedin.com or facebook.com. The input triggers may be a request to enter data or to be directed to a certain form, or actual entry or importation of data through the UI controller, or certain navigation actions by the user such as clicking or selecting a pre-determined button or field within an interview screen generated by the UI controller.

In a single or multiple embodiments, multiple identifiers for respective instances of the same schema element are generated by the UI controller using a random number or other random identifier generator. In a single or multiple embodiments, the instance identifiers are universally unique identifiers (UUID) or Global Unique Identifiers (GUID). Given the manner in which instance identifiers are generated, they are unique so as to ensure that duplicate instance identifiers are not utilized. While the probability that all identifiers are different and unique may not be 100%, the probability is sufficiently high such that the identifiers that are generated are considered unique, particularly in the context of a particular user or particular electronic tax return. In a single or multiple embodiments, the same type of instance identifiers is generated, e.g., all instance identifiers generated by the UI controller are UUIDs, or all instance identifiers are randomly generated numbers. In other embodiments, in order to provide further reduce the likelihood that the already very low likelihood that a duplicate instance identifier would be utilized, the UI controller can alternate between instance generation methods such that one instance identifier may be a first type (e.g., randomly generated number), whereas another instance identifier is a different, second type (e.g., UUID).

In a single or multiple embodiments, an instance identifier is based at least in part upon one or more of time stamp data of when the instance identifier is generated, an identifier of a hardware component of a computing device utilized to generate the timestamp data or the instance identifiers, and electronic tax return data or an encoded form thereof.

In a single or multiple embodiments, after an instance has been generated from the schema and stored to the data store such that the generated instances include the electronic tax return data and instance identifiers or instance identifiers are associated therewith, other components of the tax return preparation program can read runtime data including the instance data and instance identifiers from the data store for subsequent processing. For example, a calculation engine may read runtime data including data of various instances and their associated instance identifiers from the data store, execute one or more calculations, and write the results back to instances within the data store using the applicable instance identifiers. Further, a logic agent can read runtime data from the data store including respective instance data and respective associated instance identifiers, and which may include a result generated by the calculation engine, and use the runtime data and rules to select a question or tax topic and generate non-binding suggestions for the UI controller regarding which question or topic to present to the user. For this purpose, the logic agent may access a decision table that specifies rules and a plurality of questions and respective answers to respective questions, wherein whether a rule applies is based at least in part upon an answer to at least one question, and the runt time data read from the data store serves as answers to the questions.

The suggestion may include a question or tax topic and the associated instance identifier so that the UI controller can differentiate suggestions involving the same topic or tax document, e.g., if a particular suggestion involves a first instance for Form W-2, but not a second instance for Form W-2, then the instance identifiers can be utilized by the UI controller for differentiation.

In a single or multiple embodiments, the generated instance identifiers are used for synchronization across multiple computing devices that are utilized to prepare the electronic tax return. For this purpose, one computing device may synchronize with another computing device utilizing instance identifiers, which may involve transmitting or receiving instance data and identifiers. In this manner, instance data and the associated instance identifier is within a data store of a tax return preparation application utilized by one computing device, and the same instance data and associated instance identifier is within a data store of a tax return preparation utilized by another computing device. A shared data store may also be utilized so that the different computing devices can connect to the data store to read/write instance data and identifiers for subsequent retrieval or read by another computing device for synchronization. Thus, for example, a user may begin to prepare an electronic tax return using a tax return preparation application executing in a laptop computer, but continue preparing the electronic tax return using the tax return preparation application executing on a tablet computing device. Instance identifiers can be received or transmitted to ensure that the correct and updated data is being utilized on both computing devices, and that respective data is for the correct form, e.g., in the event that the user has multiple Form W-2s, and the unique instance identifiers will be used to ensure that data from a first Form W-2 is synched to the first Form W-2 on the other computing device, and data from a second Form W-2 is synched to the second form W-2 on the other computing device by use of the instance identifiers identifying the different Form W-2 objects.

BRIEF DESCRIPTION OF THE DRAWINGS

FIG. 6 is an example of a decision table generated based on the directed graph or completeness graph shown in FIG. 5, in which rows specify rules, and columns identify questions;

FIG. 7 illustrates an example of how a rule engine may process a decision table when determining which question to select;

DETAILED DESCRIPTION OF ILLUSTRATED EMBODIMENTS

Embodiments are directed to computer-implemented methods, computerized systems and articles of manufacture or computer program products for uniquely identifying and distinguishing instances or objects generated from the same schema element for the same type of electronic tax return data during preparation of an electronic tax return. A data store or "dictionary" of terms or schema elements and associated data may be structured according to a schema or data model. For a schema element "Form W-2," for example, when data of Form W-2 is received at the data store, an instance identifiers for that Form W-2, or data thereof, is generated and populated with the data, and when data for another Form W-2 is received, a different instance identifier is generated for that other Form W-2, or data thereof. Embodiments are implemented in a tax return preparation application structured in a modular manner and that includes a logic agent, a user interface controller and a calculation engine that share a data store. The UI controller and the logic agent are loosely coupled to each other such that the logic agent informs the UI controller potential questions or topics to ask the user of the tax return preparation application in the form of non-binding suggestions, and the UI controller determines whether/when those suggestions will be processed. Thus, the UI controller is not controlled by the logic agent or logic agent suggestions.

Figure 1:
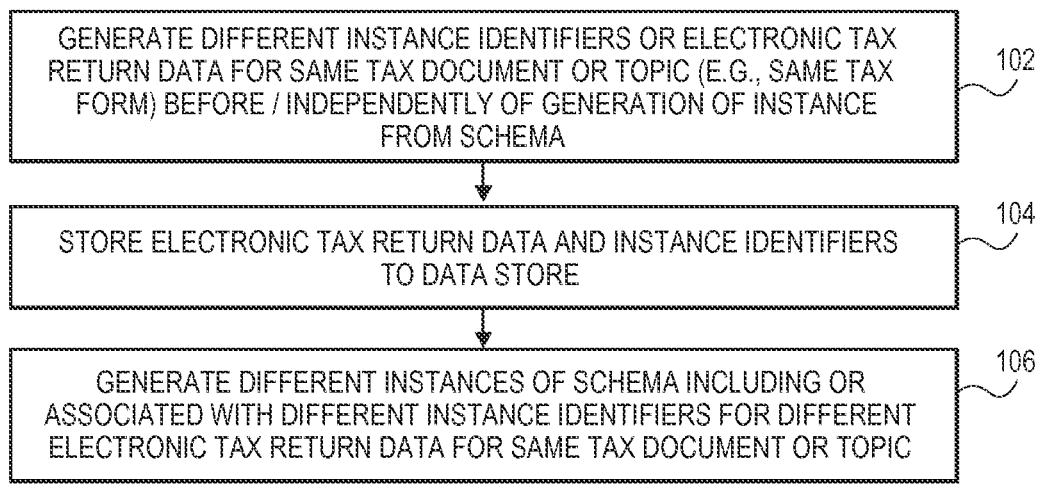
FIG. 1 is a flow diagram of one embodiment of a computer-implemented method for uniquely identifying schema instances that may involve the same tax document or topic during preparation of an electronic tax return.

In one embodiment, referring to FIG. 1, when data is received (e.g., for multiple Form W-2s or other forms or documents of the same type that the user has for preparing an electronic tax return), whether entered in an ad hoc or spontaneous manner, or in response to an interview screen generated based on a suggestion, and whether received at different times or simultaneously, different instance identifiers for the electronic tax return data for same tax document or topic are generated before and independently of generation of an instance from the schema. At 104, the electronic tax return data and instance identifiers are written to and stored in the data store, and 106, different instances are generated from the same element or term of the schema. Respective instances include the electronic tax data and associated different instance identifiers that were previously generated for subsequent processing.

Figure 2:
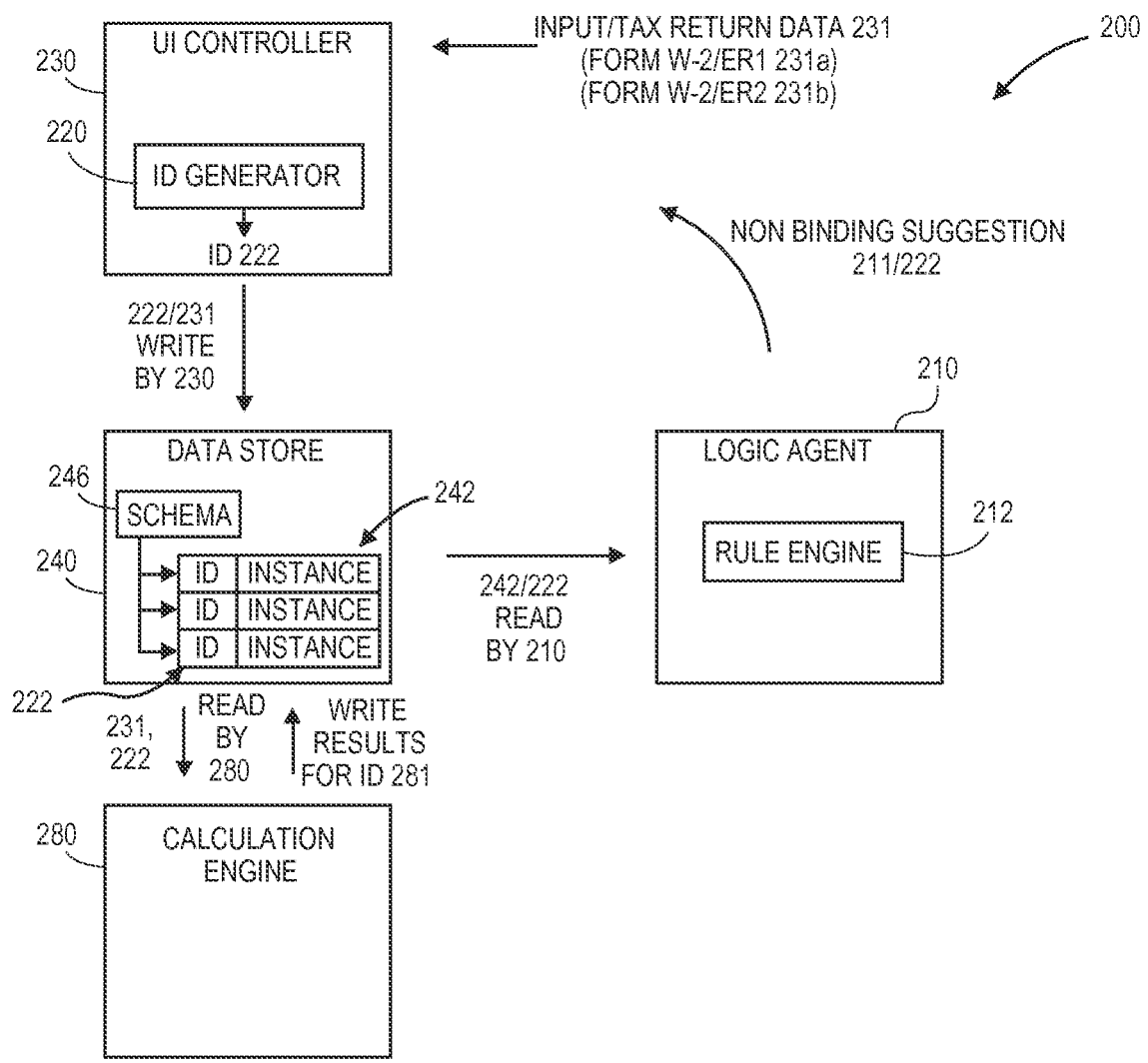
FIG. 2 is a block diagram of a system constructed according to one embodiment that is configured or operable to uniquely identify schema instances that may involve the same tax document or topic during preparation of an electronic tax return.
Figure 3:
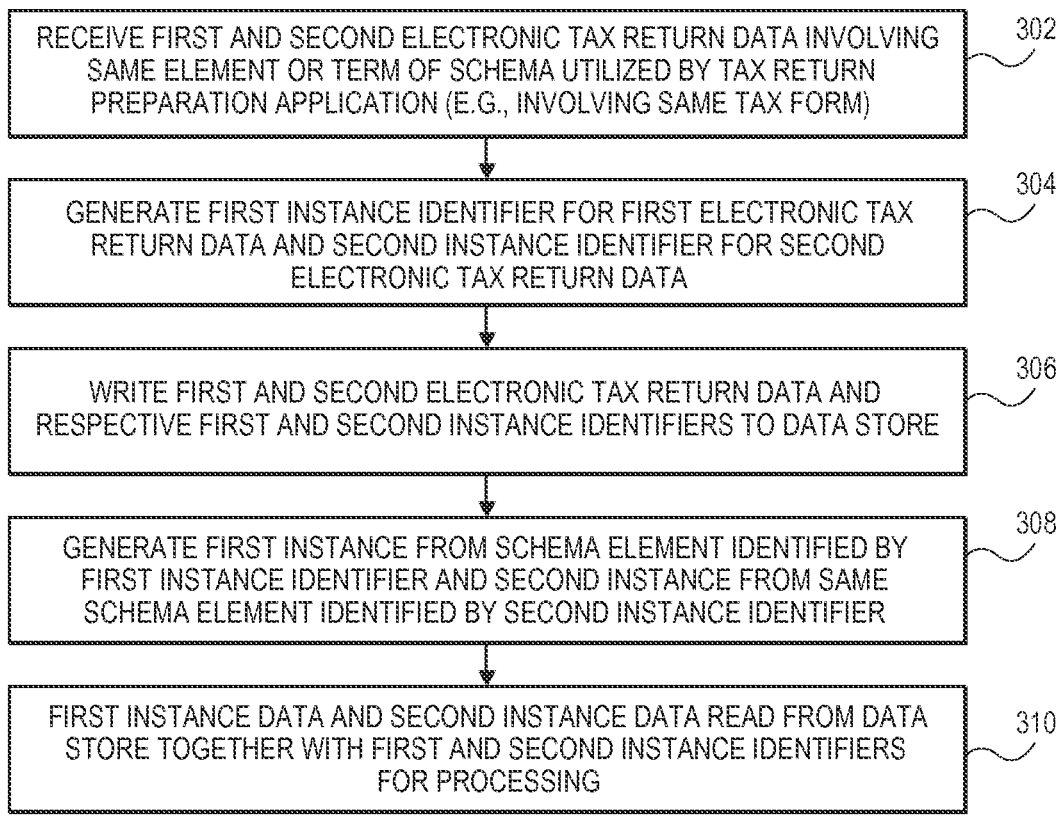
FIG. 3 is a flow diagram of one embodiment of a computer-implemented method for uniquely identifying and processing schema instances that may involve the same tax document or topic during preparation of an electronic tax return.

For example, referring to FIGS. 2-3, a system 200 constructed according to one embodiment comprises a logic agent 210 comprising a rule engine 212, which is in communication with a UI controller 230, a data store 240, and a tax calculation engine 280. The logic agent 210, UI controller 230 and calculation engine 280 all share the data store 240. The UI controller 230 at least writes to the data store 240, the calculation engine 280 reads from and writes to the data store 240, and the logic agent 210 at least reads from the data store 240. Continuing with reference to FIG. 3 at 302, the UI controller 230 receives first and second electronic tax return data 231*a*, 231*b* involving same element or term of schema 246 utilized by tax return preparation application (e.g., involving same tax form, different Form W-2s for different employers, ER1 and ER2). At 304, an identifier generator 220 of or utilized by the UI controller 230 generates different first and second instance identifiers 222*a,b* for or based at least in part upon respective first and second electronic tax return data 231*a,b*. At 306, the first and second electronic tax return data 231*a,b* and respective first and second instance identifiers 222*a,b* ("Data" and "ID" in FIG. 2) are written by the UI controller 230 to the data store 240. At 308, a first instance 242*a* is generated or initialized from an element or term of the schema 246 and identified by first instance identifier 222*a*, and a second instance 242*b* is generated or initialized from the same schema 246 element or term and identified by the different, second instance identifier 222*b*. At 310, the first instance 242*a* or runtime data and the second instance 242*b* or runtime data are read from the data store 240 together with first and second instance identifiers 222*a,b* for processing.

For example, processing may involve, the logic agent 210 determining one or more non-binding suggestions 211 based at least in part upon the runtime or instance data 242, and providing the non-binding suggestions 211 including or associated with one or more of the instance identifier 222*a,b* to the UI controller 230 (which was the source or generator of the instance identifiers 222).

Processing may also involve the calculation engine 280 reading the runtime or instance data 242, including the associated identifiers 222, and performing calculations using the data to generate calculation results 281, which are written back to the instances 242/data store 240 and with reference to the identifiers 222, and then the runtime data 242 including the new result 281 is read by the logic agent 210. Thus, not only does the UI controller 230 generate the instance identifiers 222 for received electronic tax data 231, but other components utilize that identifiers 222, and the identifiers 222 are later utilized by the UI controller 230 when the UI controller 230 determines whether or how to process the received non-binding suggestions 211. Further details regarding embodiments are described with reference to FIGS. 4-17.

Figure 4:
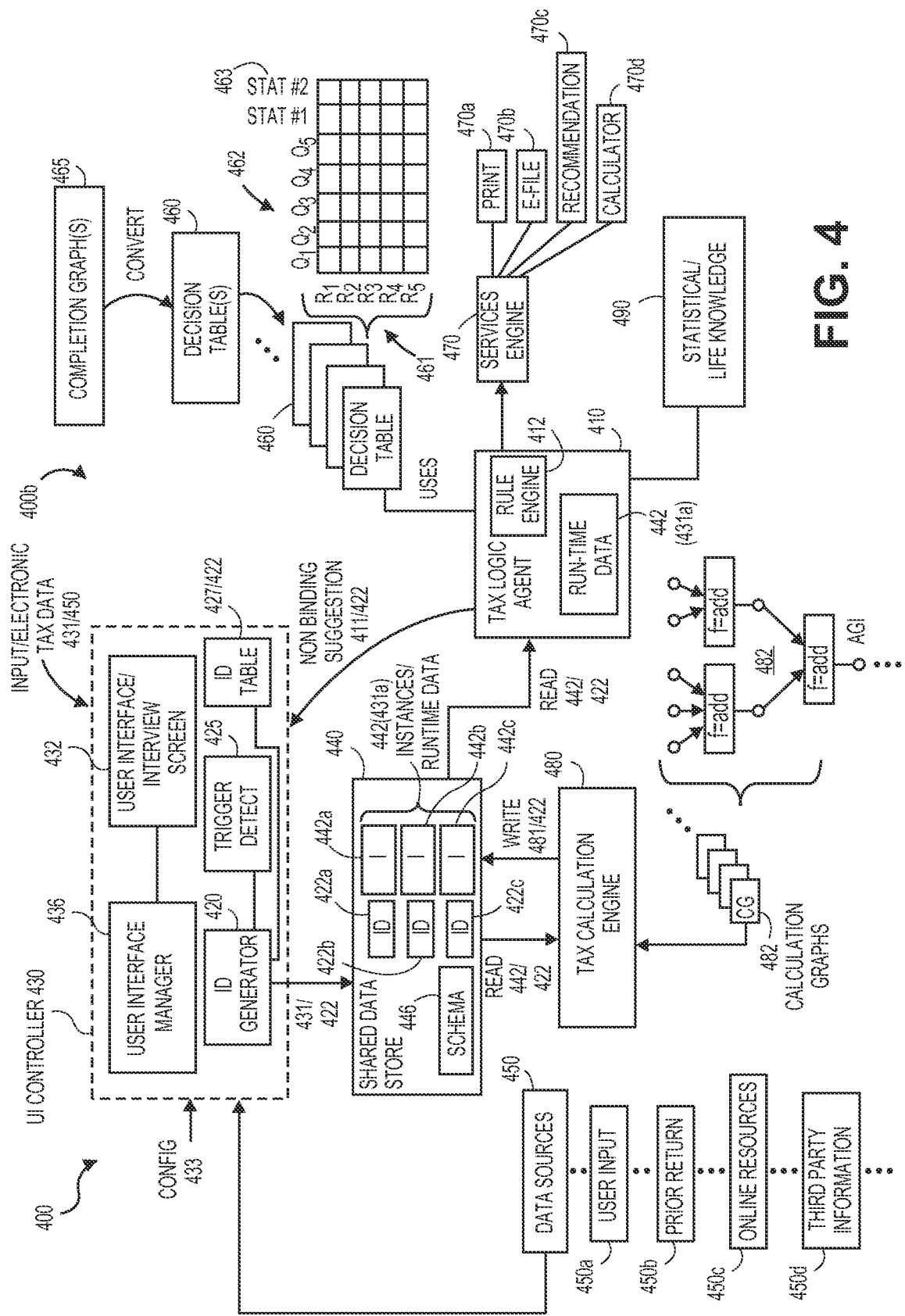
FIG. 4 is a block diagram of a system constructed according to one embodiment that includes a user interface controller configured or operable to uniquely identify schema instances that may involve the same tax document or topic during preparation of an electronic tax return.

FIG. 4 is a more detailed illustration of a system 400 constructed according to one embodiment and that includes logic agent 410 comprising or executing a rule engine 412 based on runtime or instance data 442, a UI controller 430, a shared or intermediate data store 440, and a tax calculation engine 480.

The rule engine 412, is operable to receive runtime or instance data 442 (generally, runtime data 442) that is based on a "dictionary" of terms of a data model or schema 446 (generally, schema 446) and use that runtime data 442 to analyze rules 461 of a decision table 460. For example, the schema 446 may specify, define or list tax-related concepts or terms, e.g., by names, type or category and hierarchy such as "name," "social security number," "citizenship," "address," "employer," "interest," "dividends," "mortgage," "deduction," "tax credit," "capital gain," etc. An instance 442 is instantiated or created for the collection of data received and for each term or topic of the schema 446. The schema 446 may also specify a certain format of questions and answers (e.g., answer is binary (Y/N) or a number/value). It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. It will be understood that embodiments may utilize various other schemas, and that these schemas are provided as a non-limiting example of a schema 446 that can be utilized in embodiments.

The runtime data 442 stored in the shared data store 440 is used to populate corresponding fields of an electronic tax return or electronic tax form used to prepare an electronic tax return and may be received from or based on data from various data electronic data sources 450a-d (generally, electronic data source 450). Examples of electronic data sources 450 include user input, such as a user answer to a question presented in an interview screen, data imported from a prior year electronic tax return, data from online resources (such as online social networks or other online resources) and third parties databases or resources (such as government databases or documents, such as property tax records, Department of Motor Vehicle (DMV) records, etc. The rule engine 412 reads runtime data 442 including generated identifiers 422 from the shared data store 440 and utilizes the decision table 460 including rules 461 to determine, based on the runtime data 442, which rules 461 still require data or which questions 462 still need to be presented to the user based on the runtime data 442 being answers to various questions 462, or data for the rules 461, of the decision table 460.

Various types of rules 461 may be utilized by embodiments. For example, "tax" rules 461 that are utilized by the rule engine 412 may specify which types of data or tax documents are required, or which fields or forms of the electronic tax return should be completed. One example is if a taxpayer is married, then the electronic tax return is required to include information about a spouse. A tax rule 461 may involve if a certain box on a form (e.g., Box 1 of Form W2) is greater than a pre-determined amount, then certain fields of the electronic tax return (e.g., withholding fields) cannot be left empty and must be completed. Thus, tax rules 461 may reflect various tax requirements and are expressed using the concepts or terms of the data model or schema 446. As another example, other rules 461 may specify tax consequences or calculations and for this purpose, the logic agent 410 may be in communication with other modules or services 470a-d (generally, "Additional Services" such as printing, e-filing, tax recommendations, calculation).

Rules 461 can be used for identifying or narrowing which questions 462 are identified as potential questions to be presented to the user. This may involve utilizing rules 461 based on one or more associated data structures such as a decision table 460, which is based on a completion graph 465, which recites, for example, the requirements of a tax authority or a tax authority rules or laws. The decision table 460 may be used for invalidation of potential questions 461 or topics and input or runtime data 442 requirements.

Figure 5:
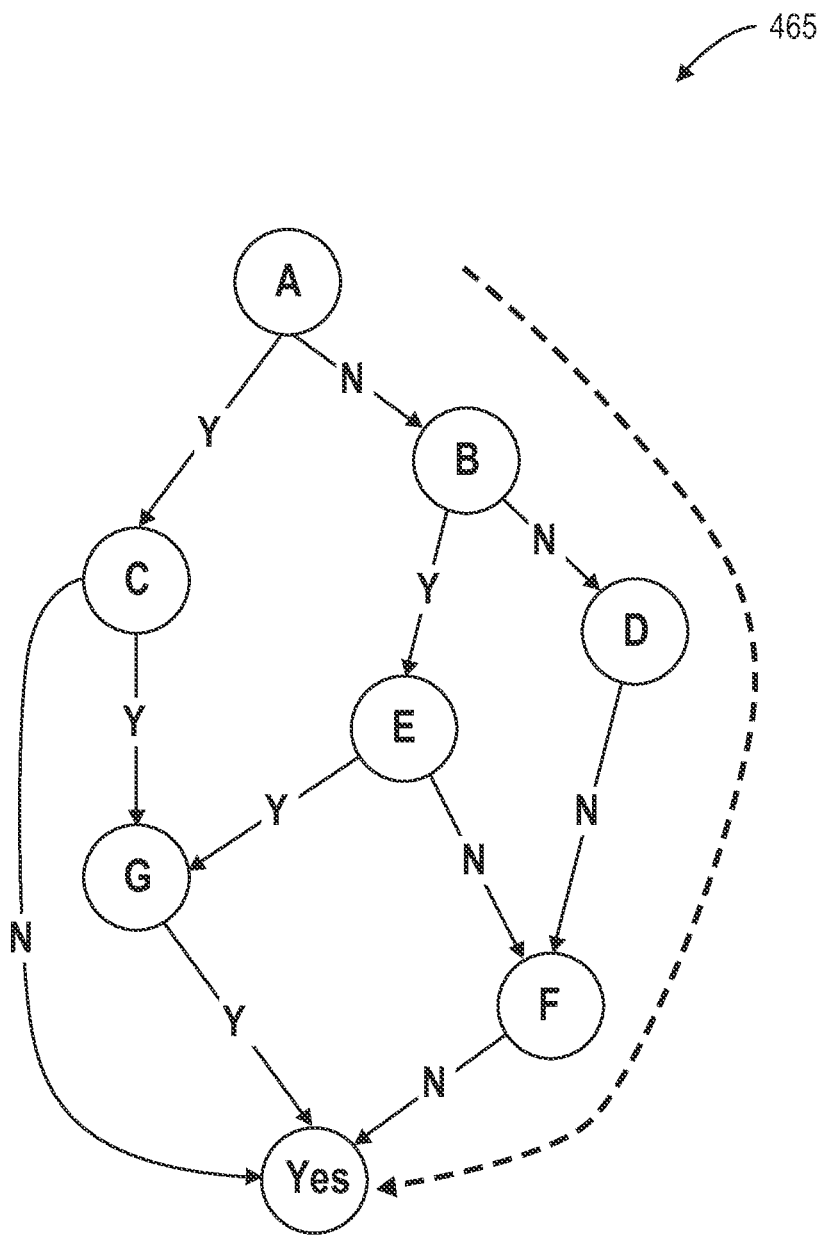
FIG. 5 illustrates an example of a directed graph or completeness graph.

For example, referring to FIGS. 5-7, and as described in further detail in U.S. application Ser. No. 14/097,057, filed Dec. 4, 2013, entitled Methods Systems and Computer Program Products for Applying Generated Rules for Personalized Interview Experience" and U.S. application Ser. No. 14/206,834, filed Mar. 12, 2014, entitled "Computer Implemented Methods Systems and Articles of Manufacture for Suggestion-Based Interview Engine for Tax Return Preparation Application, the contents of which are expressly incorporated herein by reference as though set forth herein in full, a completeness or directed graph 465 reflects a flow of questions and answers of requirements, rules or laws a tax authority (as generally illustrated in FIG. 5), and the directed graph 465 is converted into a decision table 460 (as generally illustrated in FIG. 6). The decision table 460 reflects the question-and-answer flow of the completeness or directed graph 465. In the illustrated example, rows of the decision table 460 define rules 461 (e.g., Rules R1-R5 as shown in FIG. 6), and columns of the decision table 460 indicate questions 462 (Q1-Q5 shown in FIG. 4, or Questions A-G shown in FIG. 6), and the runtime data 442 serves as answers to questions to fill in the decision table 460 and to determine or select questions 462 that can be selected by the rule engine 412 to be presented to the user. In one embodiment, statistical data 463 (which may be appended as columns to the rule-question decision table 460, and received from or based on data collected by statistical/life knowledge module 490 described in further detail below) indicates how likely a question or topic 462 is to be relevant to a user given a set of runtime data 442 and may be utilized by the rule engine 442 when determining which question or topic 462 to select.

The logic agent 410 may also receive or otherwise incorporate information from a statistical/life knowledge module 490. The statistical/life knowledge module 490 contains statistical or probabilistic data related to the current or other users of the tax return preparation application and/or other taxpayers. For example, statistical/life knowledge module 490 may indicate that taxpayers residing within a particular zip code are more likely to be homeowners than renters. The logic agent 410 may use this knowledge to weight particular topics or questions related to these topics when processing rules 461 and questions 462 and generating non-binding suggestions 411 of a question, declarative statement or identification of a topic to ask the user.

For example, questions 461 about home mortgage interest may be promoted or otherwise given a higher weight for users in particular zip codes or income levels. The statistical knowledge may apply in other ways as well. For example, tax forms often require a user to list his or her profession. These professions may be associated with transactions that may affect tax liability. For instance, a taxpayer may list his or her occupation as "teacher." The statistic/life knowledge module 490 may contain data that shows that a large percentage of teachers have retirement accounts, and in particular, 403(b) retirement accounts. This information may then be used by the logic agent 410 when generating its suggestions 411. For example, rather than asking generically about retirement accounts, the suggestion 411 can be tailored directly to a question about 403(b) retirement accounts.

The data that is contained within the statistic/life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 490. This information may be periodically refreshed or updated to reflect the most up-to-date relationships. Generally, the data contained in the statistic/life knowledge module 490 is not specific to a particular tax payer but is rather generalized to characteristics shared across a number of tax payers although in other embodiments, the data may be more specific to an individual taxpayer.

In one embodiment, the rule engine 412 reads the runtime data 442 and uses that data 442 as answers or inputs to the decision table 460 to eliminate rules 461 that may apply which, is used to eliminate candidate questions 462 from consideration rather than requiring the user to step through each question of a pre-determined sequence of questions in order to conclude that a particular tax situation or topic applies to the user.

For example, continuing with the example shown in FIGS. 5-6, and with further reference to FIG. 7, runtime data 442 that is known is used to determine which rows or rules 461 to cross out in the decision table 460. In the illustrated example, if it is known from the runtime data 442 that the answer to Question A is "Y" then rules 461 R3-R5 involving a "N" answer to Question A are not applicable, and those rows of the decision table 460 including a "N" answer to Question A (i.e., the bottom three rows in the illustrated example) can be crossed out or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining questions 461 that require answers based on the current runtime data 442 include Questions C and G. Thus, the rule engine 412 uses the decision table 460 to select one or more rules 461 and determine or select one or more candidate questions 462 that are unanswered in view of the current runtime or instance data 442.

The logic agent 410 provides to the UI controller 430 a non-binding suggestion 411 comprising a selected question or topic 461 to be addressed. In the illustrated embodiment, the UI controller 430 includes a UI or user experience manager 436 that determines how to process the non-binding suggestions 411 with the selected questions or topics 461 and generates an interview screen 432 for the UI or selects an interview screen 432 of the UI based on the question or topic 461 of the non-binding suggestion 411. For ease of explanation, reference is made generally to a UI controller 430.

The UI controller 430 suggestion resolution element, a generator element, and an interview screen management element or flow/view management" module as described in U.S. application Ser. No. 14/206,834, previously incorporated herein by reference, the suggestion resolution element is responsible for resolving the strategy of how to respond to incoming non-binding suggestions 441 provided by the logic agent, and for this purpose, the suggestion resolution element 341 may be programmed or configured or controlled by configuration files 433 that specify whether, when and/or how non-binding suggestions 411 are processed (e.g., priority, sequence, timing, in a current, next or subsequent interview screen, random, never or ignore, not until additional data received or other tax forms are completed).

For example, a configuration file 433 may specify one or more or all of how to process the non-binding suggestion 411 based on whether to consider or ignore the non-binding suggestion 411, when the non-binding suggestion 411 should be processed, content of an interview screen 432 based on the non-binding suggestion 411, how to present content or interview screens 432 based on the non-binding suggestion 411 in view of a form factor or type of a computing device utilized by the user of the tax preparation application or that executes the tax return preparation application embodying system components described above, which non-binding suggestion(s) 411 have priority over others or a sequence of non-binding suggestions 411, which configuration files 433 have priority over others or a sequence of configuration files 433 in the event that multiple configuration files 433 may potentially be used for purposes of configuration conflict resolution. For example, a configuration file 433 may specify that a non-binding suggestion 411 should be processed or addressed immediately or on the spot, next, at a later time, after certain or other additional tax return data has been received, or at the end of the process. Configuration files 433 may also specify whether non-binding suggestions 411 should be processed individually or aggregated for processing as a group with resolution of any priority issues. As another example, a configuration file 433 may specify that content should be adjusted or whether or how non-binding suggestions 411 should be processed in view of a screen size or dimension of a type of computing device that executes the tax preparation application since questions or more content may be more suitable for computing devices such as laptop and desktop computers, which have larger screens than smaller mobile communication devices such as smartphones.

The UI controller 430 generates the resulting user interaction or experience or creates or prepares an interview screen 432 or content thereof based on a library of visual assets such as pre-programmed interview screens or interview screens that are templates and that can be populated by the UI controller with a question 461 or topic of a non-binding suggestion 411.

With continuing reference to FIG. 4, the tax calculation engine 480 reads the current runtime data 442 from the shared data store 440, and uses this data as inputs into respective nodes of one or more calculation graphs 482 (one example of which is provided in FIG. 12B and involves taxable income and tax due calculations), and respective results or values are calculated with associated functions that are executed with the input data. New or resulting data is written back by the tax calculation engine 480 to the shared data store 440 for subsequent reading by the logic agent 410. For example, if the runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, the tax calculation engine 480 will run the calculation graphs 482 again to calculate a new AGI value, which would then be stored to the data store 482.

Thus, in contrast to the rigidly defined user interface screens used in prior iterations of tax preparation software, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. A smart tax logic agent 410 running on a set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions.

Additionally, according to embodiments, the UI controller 430 includes or utilizes an identity generator module 420 (generally, ID generator 420) as shown in FIG. 4 that generates an identifier 422 for an instance 442 to be generated based on a schema 446 of the data store 440. Thus, embodiments involve an ID generator 420 that generates an identifier 422 for an instance 442 independently of the data store 440 or processing element of or utilized by the data store 440 to generate instances 442, and before the instance 442 has been generated from the schema 446. Further, in the embodiment illustrated in FIG. 4, embodiments involve a UI controller 430 including the ID generator 420 to generate an instance identifier 422 and later receive a non-binding suggestion 411 with that same instance identifier 422 for continuing reference by the UI controller 430 when processing suggestions 411 and writing results 481 or electronic tax return data 431 to the shared data store 440. Thus, embodiments, uniquely identifying instances 442 and suggestions 411, which may involve the same term or element of the schema 446. For example, if a taxpayer has multiple Form W-2s for different jobs, or multiple 1099-INT forms for interest earnings from different financial institutions, embodiments are utilized to uniquely identify and distinguish these two different forms for the same topic. In this manner, the calculation engine 480, the logic agent 410, and the UI controller 430, initially and when processing non-binding suggestions 411, can uniquely identify the proper Form W-2 or Form 1099-INT that is the subject of a calculation result 481 or suggestion 411, for example, and which ones are not. Further embodiments and aspects of embodiments are described in further detail below with reference to FIGS. 8-17.

Figure 8:
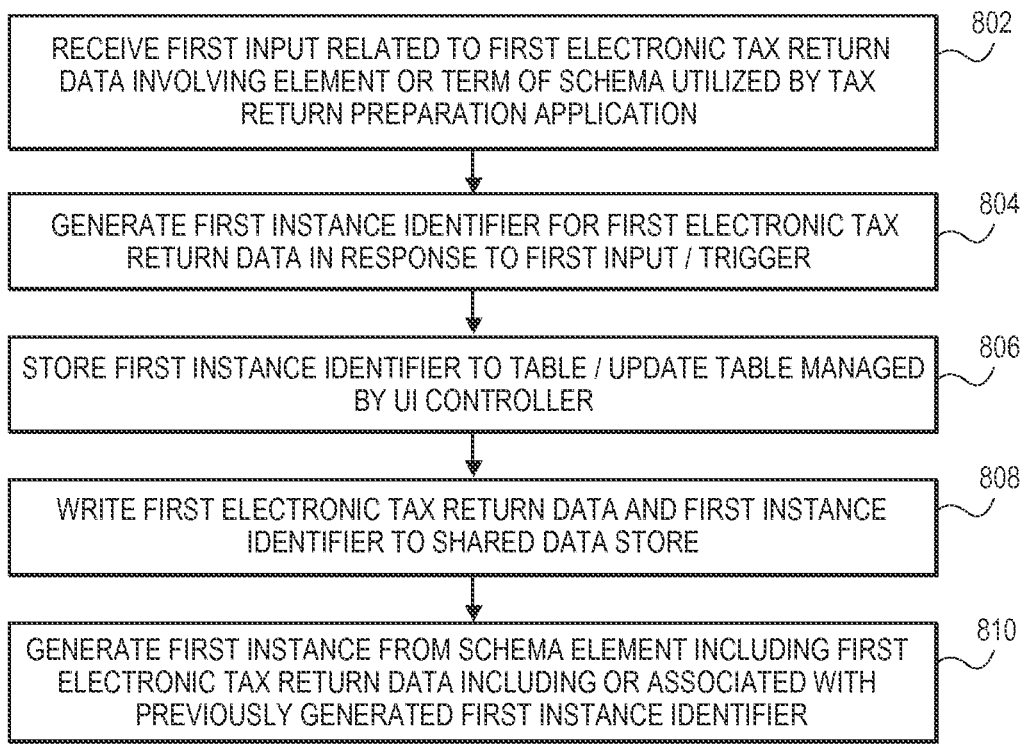
FIG. 8 is a flow diagram illustrating one embodiment for generating and writing electronic tax return data and an instance identify to a shared data store.

Referring to FIG. 8, in a computer-implemented method according to one embodiment, at 802, the UI controller 430 receives a first input of or related to first electronic tax return data 431 involving element or term of schema 446 utilized by tax return preparation application. The input may be a request by a user to begin preparing a particular electronic tax return form, selecting a field, entering data, or importing data. One or more of these inputs is used to trigger generation of an instance identifier 422, and for this purpose, the UI controller 430 as shown in FIG. 4 includes a trigger detect module 425 (generally, trigger 425) in communication with the ID generator 420. Thus, according to one embodiment, a trigger input for generation of an instance identifier 422 is the user submitting a request through the UI controller 430, or through an interview screen 432 generated by the UI controller 430, to enter data into an electronic tax form of the electronic tax return. For example, the trigger input may be based on a request to begin preparation of a particular tax document, or selection of a button, field or other UI element within an interview screen 432 generated by the UI controller 430, or entry by the user of data into a field or selection of a certain answer or option presented with in an interview screen 432. Other embodiments may involve a trigger input in the form of a request by the user to import electronic tax return data from an electronic tax return of a prior tax year, initiating the importation of such data, or populating a pre-determined field of an interview screen 432 with such data. Other embodiments may involve a trigger input in the form of a request to import electronic tax return data from an electronic file of a financial management system utilized by the user, initiating the importation of such data, or population of a pre-determined field of an interview screen 432 with such data. Further, the UI controller 430 may involve a trigger input in the form of a request to import, or importation of, data from other data resources such as an account the user has with an online social networking site such as linkedin.com or facebook.com.

Continuing with reference to FIGS. 4 and 8, at 804, the UI controller 430 generates a first instance identifier 422a for first electronic tax return data 431a in response to first input/trigger detected by the trigger module 425. Continuing with the examples above, the electronic tax return data 431a may be for Form 1099-INT, and a first instance identifier 422a is generated for this data.

According to one embodiment, an instance identifier 422 is generated for each data element received, e.g., for each specific piece of data (name, SSN, income, etc.) as well as for a collection or aggregation or collection of data (e.g., a separate instance identifier 422 for schema 466 element Form W-2 that includes a collection of other data that have their own instance identifiers 422). According to one embodiment, the instance identifier 422 that is generated is a Universally Unique Identifier (UUID), which is represented by 32 hexadecimal digits, resulting in approximately $3.4 \times 10^{38}$ possible UUID combinations. While this specification refers to a "unique" instance identifier 422, it will be understood that the probability of an instance identifier 422 being unique or not being duplicated is 99.99%+ (e.g., for when UUIDs are utilized), and while there is a minute possibility that there could be a duplicate UUID, for purposes of explanation, reference is made to a unique UUID or unique instance identifier 422.

According to another embodiment, the instance identifier 422 is generated by the UI generator 430 utilizing a random generator, such as a random number generator of a suitable number of digits to provide a suitable number of number possible instance 422 variations to provide for "unique" instance identifiers 422. UUIDs may also involve randomly generated numbers.

Certain embodiments may utilize instance identifiers 422 that embody or incorporate other aspects of the system, such as timestamp data of when a user request was made through the UI controller 430, when electronic tax return data 431 was received or imported, and timestamp data of when an instance identifier 422 was generated. UUIDs may also use or be based at least in part upon these or other types of timestamp data. Certain embodiments may also embody or incorporate other system aspects such as an identifier, such as a network address, of a computing component that generated the instance identifier 422. UUIDs may also be based on a Media Access Control (MAC) address of the computing component that generated the UUID. Certain embodiments may also utilize an instance identifier 422 that embodies or encodes the electronic tax return data 431 itself. Embodiments may also utilize one or more of these identifier generation methods. Moreover, while FIG. 8 involves generation of a first instance identifier 422*a*, or first set of instance identifiers, a second instance identifier 422*b* or second set of instance identifiers (as described with reference to FIG. 9) may be generated utilizing the same generation method, or generated utilizing a different generation method to increase the probability that instance identifiers 422 will not be duplicated. Accordingly, it will be understood that various types, numbers and combinations of instance identifier generation methods may be utilized according to embodiments. For ease of explanation, reference is made to the UI controller 430 generating the instance identifier 422.

Continuing with reference to FIG. 6, at 806, according to one embodiment, the UI controller 430 may maintain a record of the instance identifiers 422 that are generated for a particular user, or for a particular tax return, and record those to a table 427, database or other data structure maintained by the UI controller 430 or ID generator 420. This table 427 may be used as cross-check to ensure that no duplicate instance identifiers 422 have been generated (although such probability is very low) and also for recording information about non-binding suggestions 411 involving those instance identifiers 422 as described in further detail below. If a duplicate instance identifier 422 is detected, the ID generator 420 may generate another instance identifier 422.

At 808, the first electronic tax return data 431*a* and the first instance identifier 422*a* generated by the UI controller 230 are written to the shared data store 240 which, at 808, generates a first instance 442*a* from a schema 446 element or term including first electronic tax return data 431*a* and including or associated with previously generated first instance identifier 422*a*. As noted above, the first electronic tax return data 431*a* may involve different numbers of instance identifiers 422, and for ease of explanation, reference is made to first electronic tax return data 431*a* and a first instance identifier 422*a*.

Figure 9:
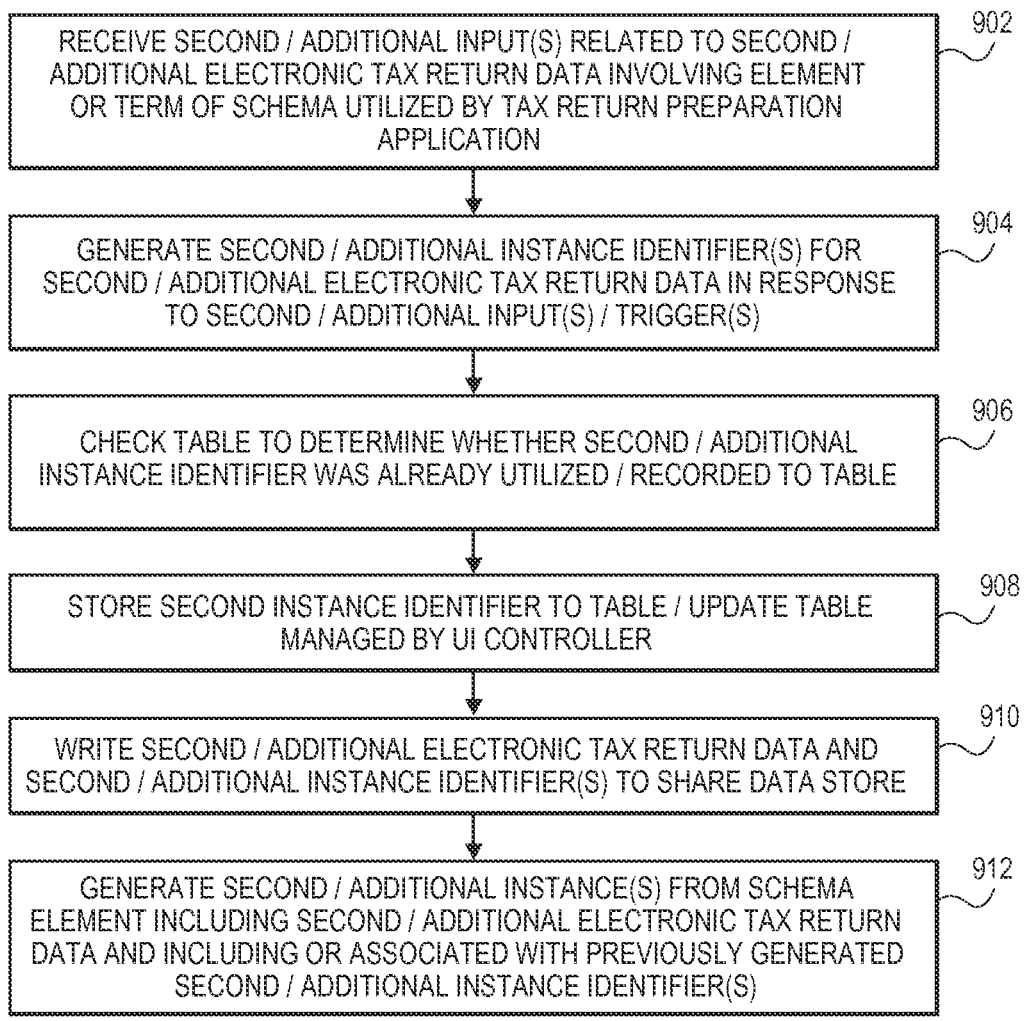
FIG. 9 is a flow diagram illustrating one embodiment for generating and writing additional electronic tax return data and another instance identify to a shared data store and performing checks for duplicate instance identifiers.

Referring to FIG. 9, and with continuing reference to FIG. 4, at 902, the UI controller 430 receives a second input of or related to second electronic tax return data 431*b* involving element or term of the schema 446 utilized by tax return preparation application. As described above, the second or additional input may be a request to enter data or generate a new tax document, selecting a field or button of an interview screen, entering data or importing data, and one or more of these actions detected by trigger detector 425 to generate another instance identifier 222*b*. Continuing with the example above, this may involve a second Form-W2 for a user's second job, or another Form-1099 for interest earned from another financial institution. At 904, the UI controller 430 generates the second or additional instance identifier(s) 222*b* for second/additional electronic tax return data 231*b* in response to second/additional input(s)/trigger(s), and at 906, if necessary, checks the table 247 to determine whether the generated instance identifier 422 was previously utilized. While the probability of a duplicate identifier 422 is very low, particularly when using UUIDs, probabilities of a duplicate identifier 422 may increase if generation methods involving fewer possible instance identifiers 422 are utilized. If the instance identifier 422*b* has been utilized before, another one is generated by the ID generator 420. At 908, assuming that the second or additional instance identifier 422*b* has not been utilized previously, or following generation of another unique identifier, the second instance identifier 422*b* is written to the table 427 managed by the UI controller, 430 and at 910, the second electronic tax return data 431*b* and the second instance identifier 422*b* generated by the UI controller 430 are written to the shared data store 240 which, at 912, generates a second instance 422*b* from the schema 446 element or term including second electronic tax return data 431*b* and including or associated with previously generated second instance identifier 422*b*. As noted above, the second electronic tax return data 431*b* may involve different numbers of instance identifiers 422, for but ease of explanation, reference is made to first electronic tax return data 431*a* and a first instance identifier 422*a* and to second electronic tax return data 431*b* and a second instance identifier 422*b*.

Figure 10:
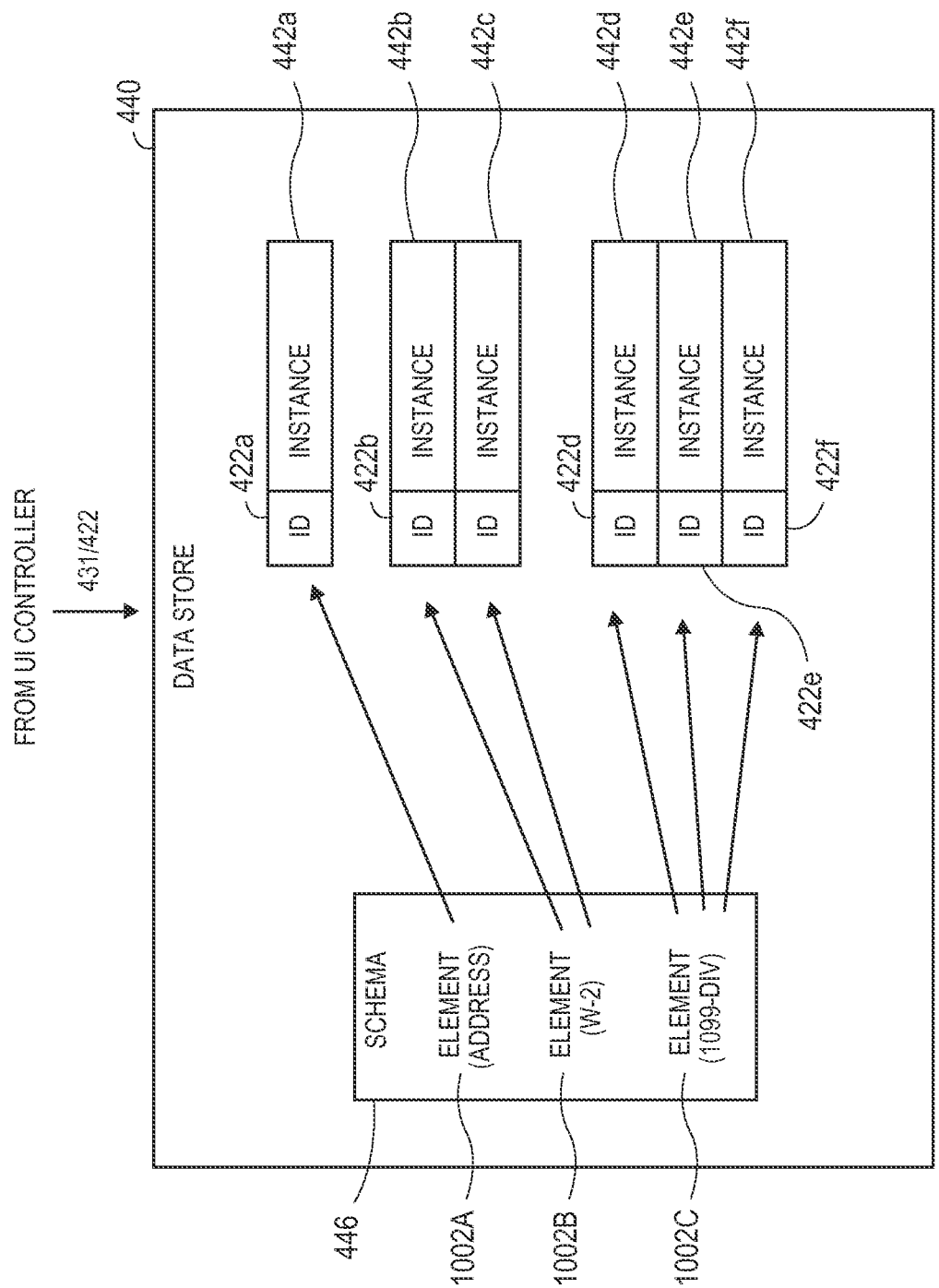
FIG. 10 illustrates an example in which a single instance identifier is generated for a single schema element and multiple instance identifiers are generated for another schema element.
Figure 11:
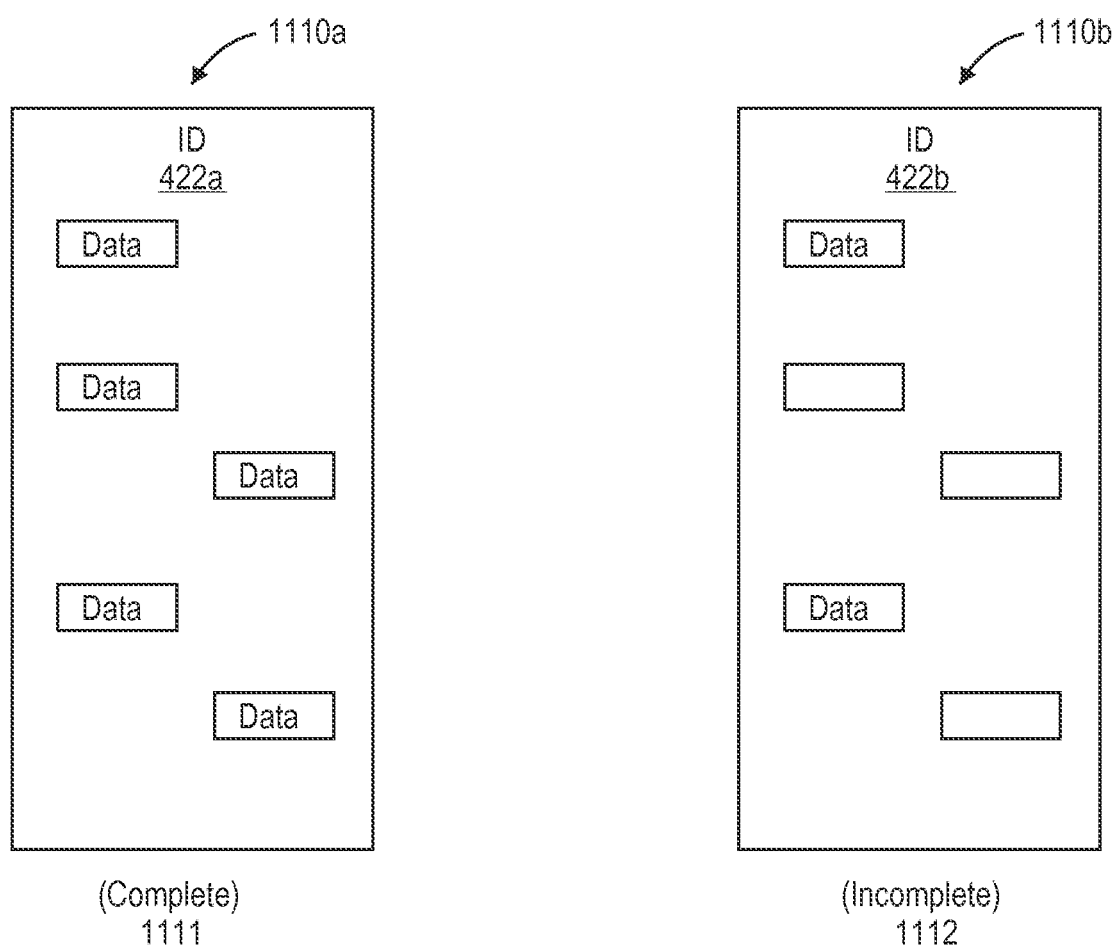
FIG. 11 illustrates how different instances identified by different instance identifiers for the same schema element such as instances for Form W-2, may have different data and different levels of completeness.

Thus, referring to FIG. 10, depending on the types of electronic tax return data 431 being entered, there may be only one instance 442 generated from a particular element 1002*a* of the schema 446, whereas for other elements of the schema 446, there may be multiple instances 442 (e.g. for multiple Form W-s or multiple 1099-INT). FIG. 10 generally illustrates one instance 442*a* being generated for a particular element 1002*a*, two instances 442*b,c* being generated from another schema element 1002*b*, and three instances 442*d-f* being generated from yet another schema element 1002*c*. Further, referring to FIG. 11, based on the data received thus far, for two Form W-2s, for example, all of the data may have already been entered into one of the forms 1100*a* such that the instance 442 for that schema element contains all data to complete 1111 that form, whereas the other instance is incomplete and still requires data 1112.

Figure 12A:
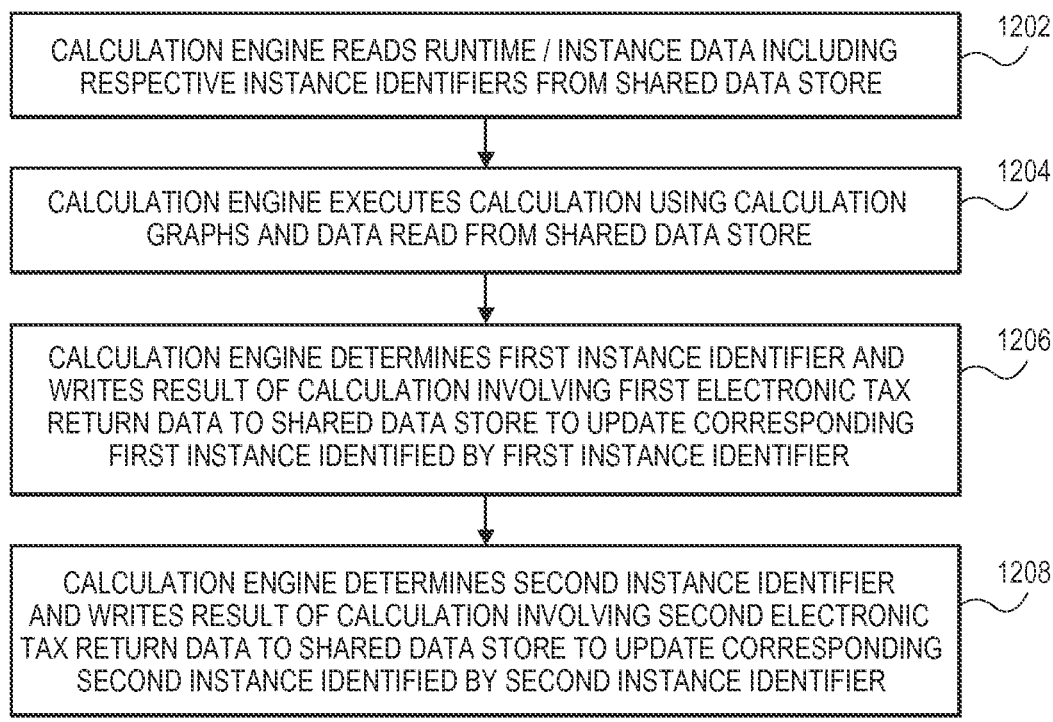
FIG. 12A is a flow diagram showing how embodiments may utilize a calculation engine that generates a result that is written to a shared data store using instance identifiers generated according to embodiments.
Figure 12B:
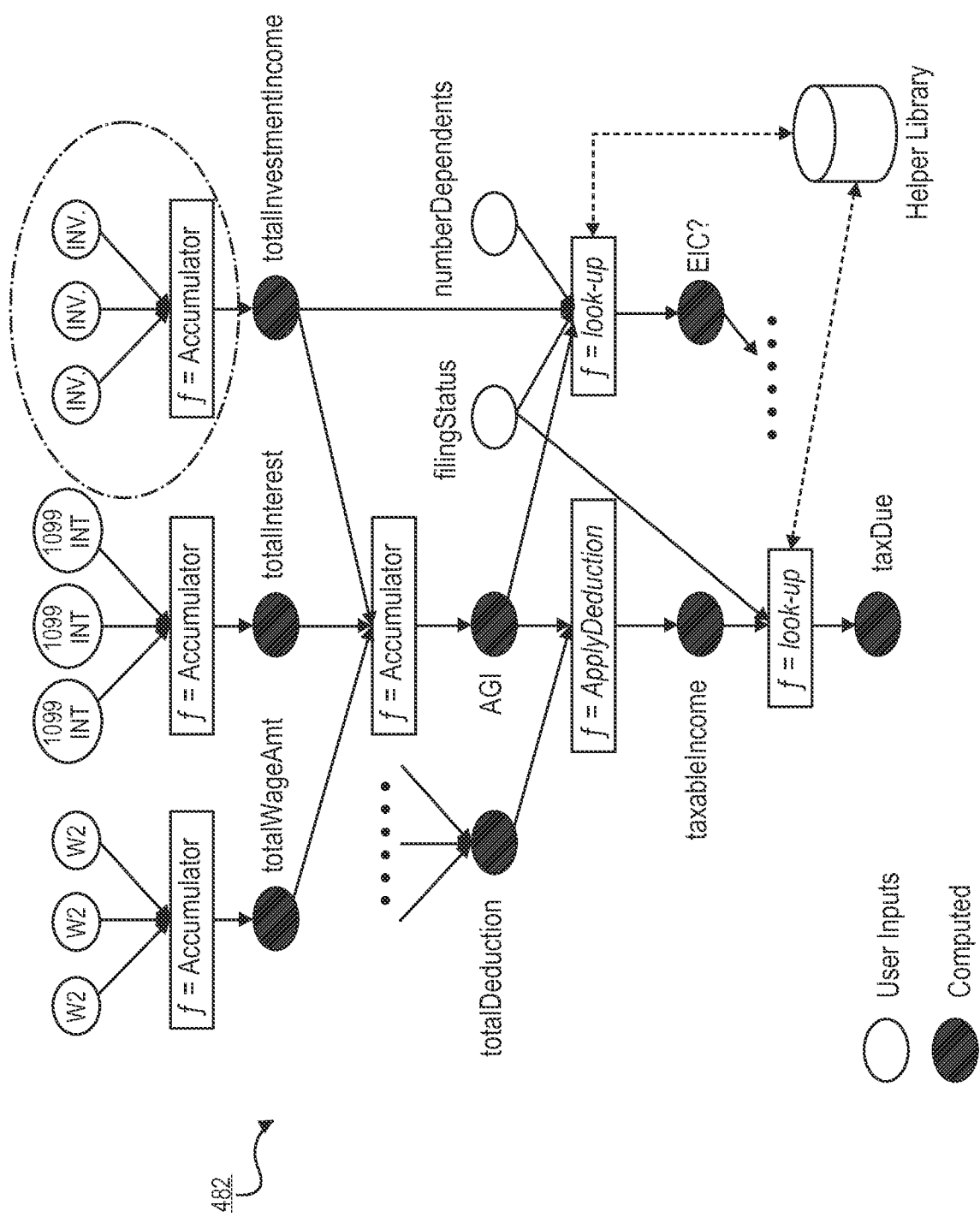
FIG. 12B illustrates an example of a calculation graph utilized according in embodiments.
Figure 13:
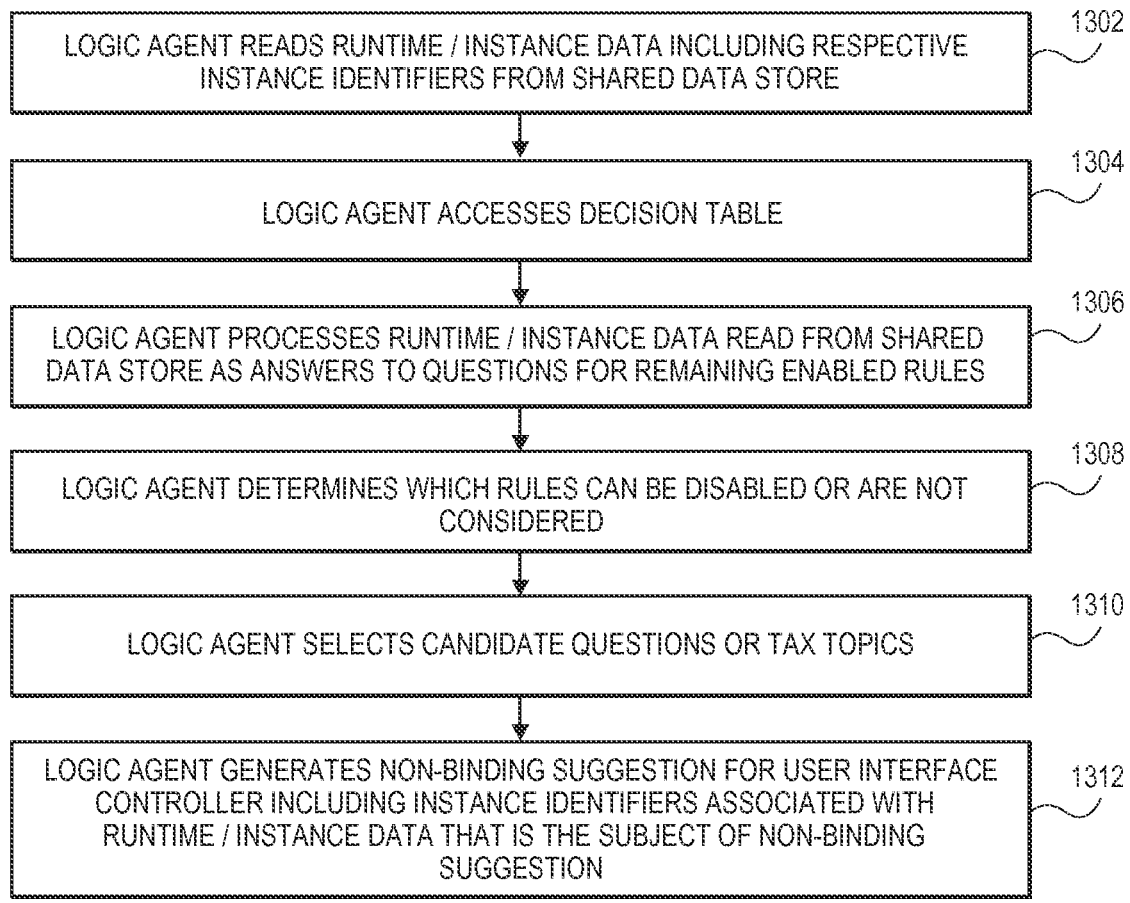
FIG. 13 is a flow diagram showing how embodiments may utilize a logic agent that reads runtime or instance data and associated unique instance identifiers from a shared data store for processing to generate non-binding suggestions for a user interface controller.

Referring to FIGS. 12A-B, having generated instance identifiers 422, and written the respective electronic tax return data 431 and respective instance identifiers 422 to the data store 240, at 1202, the calculation engine 480 reads the runtime data 442 from the data store 440, which includes the first and second electronic tax return data 431*a,b* and respective first and second instance identifiers 422*a,b*, and at 1204, executes a calculation using calculation graphs 482. For this purpose, runtime or instance data 442 is read from the data store 440 by the calculation engine 480, and at 1206, the calculation result 481 is written by the calculation engine 480 to the data store 440.

Depending on runtime data 442 was initially available and calculations that were performed, the calculation engine 480 may operate on only first electronic tax return data 431*a*, only on second electronic tax return data 431*b*, or both. Thus, at 1206, the calculation engine 480 determines first instance identifier 222*a* and writes result 481*a* of calculation involving first electronic tax return data 431*a* to shared data store 440 to update corresponding first instance 442*a* identified by first instance identifier 422*a*. Similarly, at 1208, the calculation engine 480 determines second instance identifier 422*b* and writes result 481*b* of calculation involving second electronic tax return data 431*b* to shared data store 440 to update corresponding second instance 442*b* identified by second instance identifier 422*b*. In this manner, the calculation engine 480 utilizes the generated instance identifiers 422*a,b* to distinguish a calculation involving, for example, one Form W-2, but not another Form W-2, and is able to write a result 481 back to the correct instance 442 utilizing the generated instance identifiers 422, thus preventing or reducing the possibility that calculation results for one form will be inadvertently written to the data store 440 for another form.

While certain embodiments are described with reference to performing calculations involving both first and second electronic tax return data 431*a,b* and writing back results 481*a,b* to the data store 440 with reference to respective first and second instance identifiers 422*a,b*, it may be the case that the calculations involve one or some of the electronic tax return data, but when the calculations are performed and results are written back to the data store 440, the instance identifier 422 for that data is still utilized to ensure that the result 481 data is written back to the correct location within the data store 440. For example, first electronic tax return data 431*a* may have been processed first, and then a calculation was performed on that first electronic tax return data 431*a*, and later, the user entered data for a second form, and a subsequent calculation may involve involved only the second electronic tax return data 431*b*, or both the first and second data. Or, a calculation may involve the first electronic tax return data 431*a* again. Thus, reference is made to processing involving both the first and second electronic tax return data 431*a,b* for ease of explanation, not limitation, and it will be understood that the calculation engine 480 may operate on various types and combinations of electronic tax return data 431 that was written to or available from the data store 440 at various times.

Referring to FIG. 13, and referring again to FIG. 4, at 1302, the logic agent 410 reads the runtime data 442, which may include one or more of the first and second/additional electronic tax return data 431*a,b* and that includes, or is associated with respective first and second/additional instance identifiers 422*a,b* (and which may include any result 481 generated by the calculation engine 480 as discussed above). The logic agent 410 accesses the decision table 460 at 1304, and at 1306, processes the runtime data 442 read from shared data store 440 as answers to questions 462 for remaining enabled rules 461, and at 1308, determines which rules 461 can be eliminated or disabled (e.g., as previously described with reference to FIGS. 5-7).

At 1310, the logic agent 410 determines which questions or topics 462 remain or are eligible to be asked of the user, and these questions or topics 462, at 1312 are the subject of one or more non-binding suggestions 411 generated by the logic agent 410 and provided to the UI controller 430. According to embodiments, the suggestion 411 generated by the logic agent 410 includes or is associated with the instance identifier 422, such that the instance identifier 422 that was originally generated by the UI controller 430 for electronic tax return data 431 is also part of or associated with a non-binding suggestion 411 generated by the logic agent 430 based at least in part upon that same electronic tax return data 431.

Figure 14:
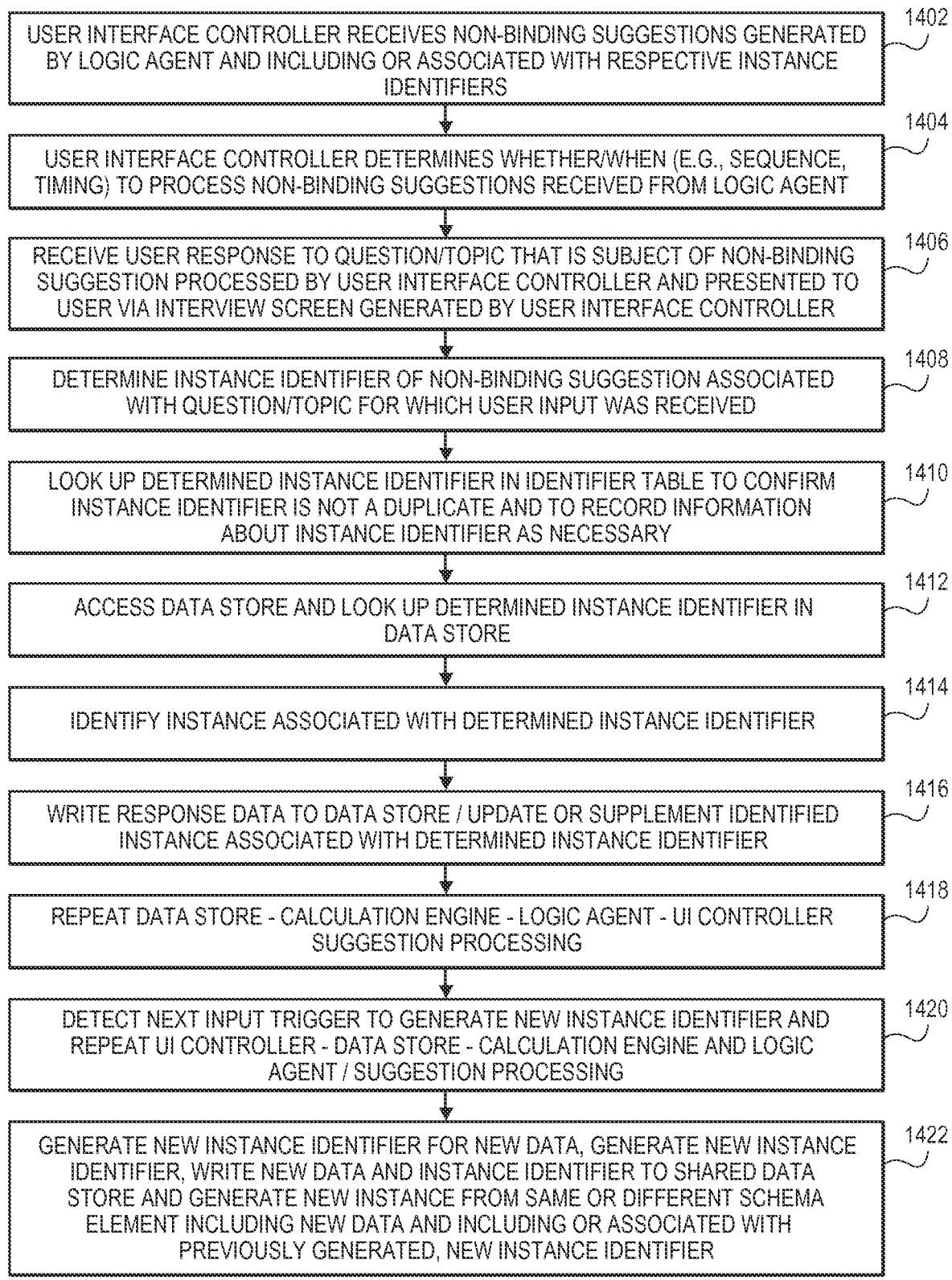
FIG. 14 is a flow diagram illustrating processing of non-binding suggestions and instance identifiers according to one embodiments.

Referring to FIG. 14, at 1402, the UI controller 430 receives the non-binding suggestions 411 generated by the logic agent 430 and including or associated with respective instance identifiers 422, and at 1404, determines whether and when (e.g., sequence, timing) to process non-binding suggestions 411 received from logic agent 430.

As discussed above with reference to FIG. 4, the UI controller's 430 analysis of non-binding suggestions 411 and whether and how to process them may be based at least in part upon an applicable configuration file 433. The UI controller's 430 decision may also be based at least in part upon what the UI controller 430 is currently processing or the UI controller's 430 current focus. For example, the UI controller 430 may be taking certain action or working on a certain document, and if a non-binding suggestion 411 involves that current action or document, the non-binding suggestion 411 may be selected before others, whereas if the non-binding suggestion 411 involves an action or document that is currently not the subject if UI controller 430 processing, the UI controller 430 may assign a lower priority to those non-binding suggestions 411. Further, if a non-binding suggestion 411 is selected by the UI controller 430 for processing, the instance identifier 422 can be utilized to identify other non-binding suggestions 411 that are also associated with the same instance identifier 422, but for a different suggested purpose. For example, a non-binding suggestion 411 with a particular instance identifier 422 may be selected since it involves data required for Form W-2, and the UI controller 430 is currently processing Form W-2 related matters, but another non-binding suggestion 411 may have been generated and that includes the same instance identifier 422, e.g., for a possible error identified by the logic agent 410. Thus, when one non-binding suggestion 411 is selected for processing, the instance identifier 422 for that suggest can be identified, then other non-binding suggestions 411 having the same instance identifier 422 can also be selected for consideration and/or processing by the UI controller 430 depending on the UI controller's 430 current focus.

With continuing reference to FIG. 14, the UI controller 430 selects one or more non-binding suggestions 411 and selects or generates one or more interview screens 432 that are presented to the user, at 1416, in response, to the questions or topics presented to the user, the user provides various answers or provides data 431/450 into the interview screen 432 and received by the UI controller 430 which, at 1408, determines the instance identifier 422 of or associated with the non-binding suggestion 411 that was the subject of the user's response to the presented question or topic.

With embodiments, the instance identifier 422 is utilized to differentiate objects or non-binding suggestions 411 involving the same tax topic or question. For example, if the user has three Form W-2s from three employers, the UI controller 430 is able to differentiate which of two of the three Form W-2s requires action or is the subject of a non-binding suggestion 411 and which ones are not.

With continuing reference to FIG. 14, at 1410, the UI controller 430 looks up the determined instance identifier 422 in the identifier table 427 to confirm the instance identifier 422 is not a duplicate and to record information about instance identifier 422 as necessary, e.g., any further or delayed actions that the UI controller 430 should take at a later time, or after other data is entered or other tax documents are completed. The UI controller 430 may also assign a priority or other status indicator concerning the instance identifier 422. Thus, the table 427 may serve a dual purpose of recording instance identifiers 422 to check for duplicates and to record actions taken or actions to be taken in the future by the UI controller 430 in connection with the UI's determinations of whether and how to process non-binding suggestions 411, e.g., in conjunction with configuration files 433, or in certain cases, the table 427 status make take priority over what is specified by a configuration file 433.

Continuing with reference to FIG. 14, at 1412, the UI controller 430 accesses the data store 440 and looks up the instance identifier 422 in the data store 440, and at 1414, identifies the identifier 422 and the instance 442 associated with determined instance identifier 422. At 1416, the UI controller 430 writes the data 431 of the user's responses or answers to the data store 440 to update the instance 442 identified by the instance identifier 422.

At 1418, for non-binding suggestions 411 and responses/answers 431 that are already associated with instance identifiers 422, the processing described above in which the calculation engine 480 accesses the data store 440, generates a calculation result 481, writes the calculation result 481 to the data store 440, the logic agent 410 reads runtime data 442 from the data store 440 and generates non-binding suggestions 411, which are processed by the UI controller 430 is repeated. At 1418, when the trigger detect module 425 detects an input trigger to generate a new instance identifier 422, the process described above in which the UI controller 430 generates the instance identifier 422, updates the identifier table 427, writes electronic tax return data 431 and the instance identifier 422 to the data store 440, and generation of an instance 422 including the electronic tax return data 431 and associated instance identifier 422 are repeated. It will be understood that whether an instance identifier 422 has already been generated for an answer or response or whether a new instance identifier 422 is generated by the UI is based at least in part upon how the schema 446 is configured, and what the input triggers are, e.g., an input trigger may be for data input into a specified field that was not answered such that a new instance identifier 422 is not yet needed, but if the specified field was answered, then the UI controller 430 would generate a new instance identifier 422 based at least in part upon the selection or entry of data for that specified field.

Figure 15:
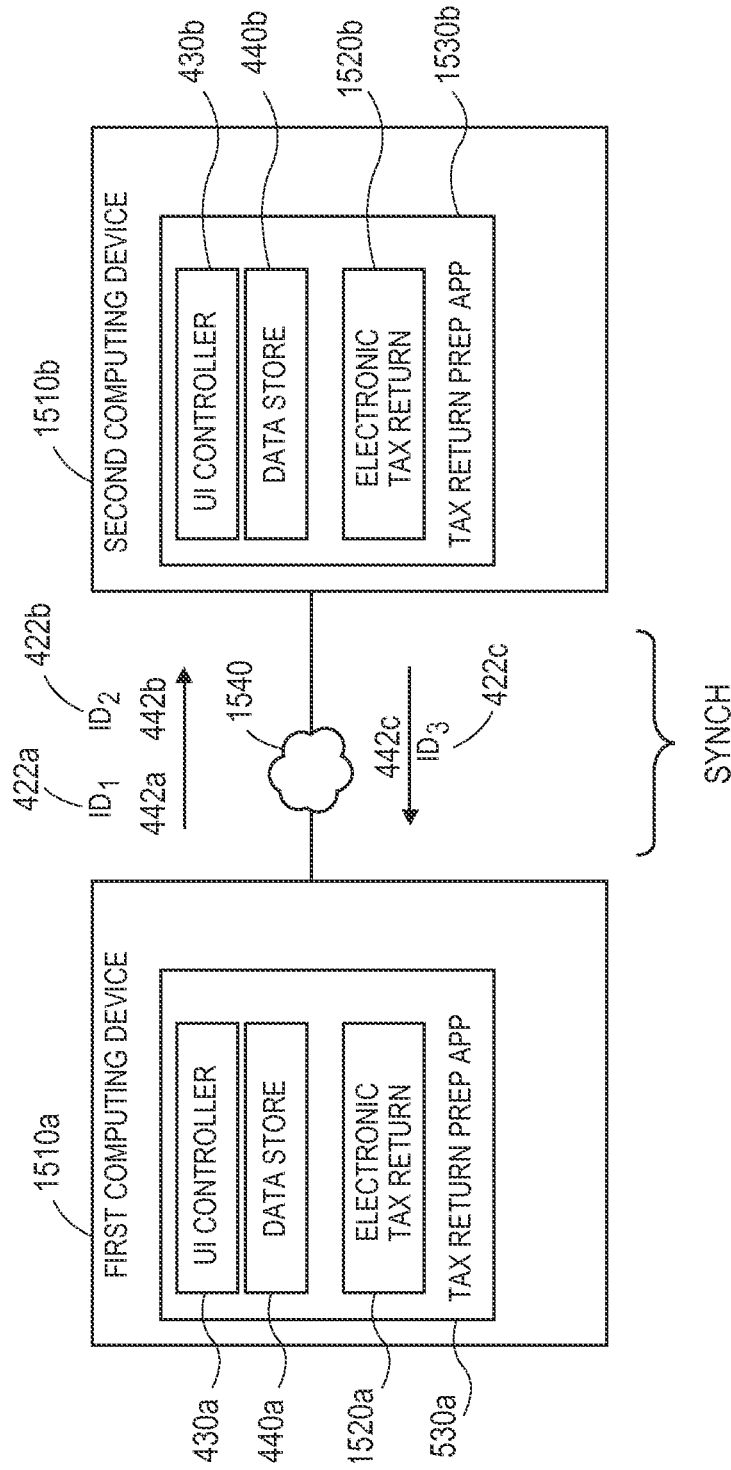
FIG. 15 illustrates how embodiments may be utilized to synchronized electronic tax return data for an electronic tax return when the electronic tax return is prepared using different computing devices.
Figure 16:
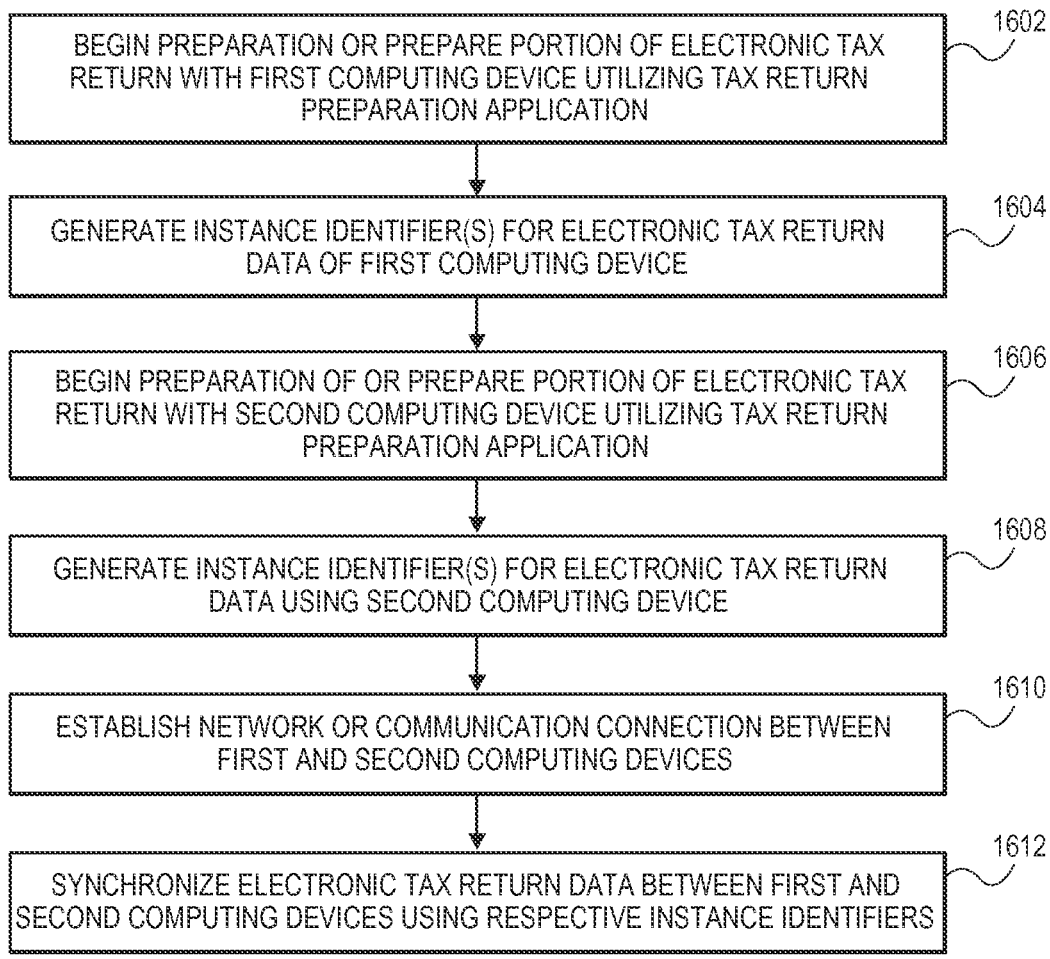
FIG. 16 is a flow diagram illustrating one embodiment of a method of synchronizing electronic tax return data across different computing devices utilizing instance identifiers generated according to embodiments.

Referring to FIGS. 15-16, instance identifiers 422 generated and processed according to embodiments may also be utilized for embodiments for synchronization of electronic tax return data 431 across different computing devices 1510*a,b* that are utilized to prepare different portions of an electronic tax return 1520. For example, at 1602, a first user begins to prepare or prepares a portion of an electronic tax return 1520 with a first computing device 1510*a* utilizing first tax return preparation application or first version of a tax return preparation application 1530, and at 1604, as described above, the UI controller 430 generates one or more instance identifier(s) 422*a-b* for respective electronic tax return data 431*a,b* received by or entered using the first computing device 1510. At 1606, the first user or a second user associated with the first user (e.g. a spouse or business partner), begins to prepare, or prepares a portion of the electronic tax return 1520 with a different, second computing device 1510*b* utilizing a second tax return preparation application 1530*b* or a second version of the tax return preparation application 1530*b*. For example, different versions of a tax return preparation application may be configured for operation on a laptop or desktop computer, whereas another version is configured for operation on a mobile communication device or a tablet computing device.

The first user may prepare a portion of the electronic tax return 1520 using a laptop computer 1510*a*, and the second user may prepare a portion of the electronic tax return 1520 using a tablet computing device 1510*b*. At 1608, the second UI controller 430*b* of the second tax return preparation application 1530 executing on the second computing device 1510*b* generates instance identifier(s) 422*c* for electronic tax return data 431*c*. At 1610, a network or communication connection 1540 between first and second computing devices 1510*a,b* is established, and the tax return preparation applications 1530*a,b* communicate with each other to synchronize electronic tax return data 431*a,b* and 431*c* between first and second computing devices 1510*a,b* using respective instance identifiers 422*a,b* and 422*c* at 1712. Synchronization may involve one-way synchronization or two-way synchronization.

For example, synchronization may involve the laptop computer 1510*a* and the tablet computing device 1510*b* being connected to each other through a wired network connection or a wireless network connection 1540, and according to one synchronization embodiment, the first UI controller 430*a* of the first tax return preparation application 1530*a* executing on the first computing device 1510*a* accesses the second table 427*b* managed by the second UI controller 430*b* and/or the second data store 440*b* of the second tax return preparation application 1530*b* executing on the second computing device 1510*b*. The first UI controller 430*a* determines whether there are any instance identifiers in the second table 427*b* or the data store 440*b* that the first UI controller 430*a* did not generate. This may involve the first UI controller 430*a* comparing instance identifiers 422 maintained in the first table 427*a* managed by the first UI controller 430*a* and the instance identifiers 422 maintained in the second table 427*b* managed by the second UI controller 430*b* and/or the second data store 427*b*. For any instance identifiers 422 that are not present within the first table 427*a* managed by the first UI controller 430*a*, this indicates electronic tax return data 431 on the second computing device 1510*b* that is not on the first computing device 1510*a*. The first UI controller 430*a* then requests the second tax return preparation application 1530*b*, e.g., through one or more of the second UI controller 430*b* and the second data store 440*b*, to transfer electronic tax return data 431 and respective instance identifiers 422 from the second computing device 1510*b* to the first computing device 1510*b* so that the first computing device 1510*a* will then include any instance data 442 of the second computing device 1510*b* identified by instance identifiers 422 not generated by the first computing device 1510*a*.

Similarly, the second UI controller 430*b* of the second tax return preparation application 1530*b* executing on the second computing device 1510*b* accesses the first table 427*a* managed by the first UI controller 430*a* and/or the first data store 440*a* of the first tax return preparation application 1530*a* executing on the first computing device 1510*a*. The second UI controller 430*b* determines whether there are any instance identifiers 422 in the first table 427*a* or the first data store 440*a* that the second UI controller 430*b* did not generate. This may involve the second UI controller 430*b* comparing instance identifiers 422 maintained in the second table 427*b* managed by the second UI controller 430*b* and the instance identifiers 422 maintained in the first table 427*a* managed by the first UI controller 430*a* and/or the first data store 440*a*. For any instance identifiers 422 that are not present within the second table 427*b* managed by the second UI controller 430*b*, this indicates electronic tax return data on the first computing device 1510*a* that is not on the second computing device 1510*b*. The second UI controller 430*b* then requests the first tax return preparation application 1530*a*, e.g., through one or more of the first UI controller 430*a* and the first data store 440*a*, to transfer instance data 442 and respective instance identifiers 422 from the first computing device 1510*a* to the second computing device 1510*b* so that the second computing device 1510*b* will then include any instance data 442 of the first computing device 1510*a* identified by instance identifiers 422 that were not generated by the second computing device 1510*b*.

Synchronization may involve one-way synchronization, e.g., from the first computing device 1510*a* to the second computing device 1510*b*, or from the second computing device 1510*b* to the first computing device 1510*a*. Thus, with one-way synchronization, one computing device includes all of the instance data, but not both computing devices 1510*a,b*. Synchronization may also be two-way synchronization so that the first and second computing devices 1510*a,b* (or other numbers of computing devices utilized to prepare an electronic tax return) are synchronized with each other and both devices have all of the current runtime or instance data 442. Synchronization may be performed in response to user request or automatically and periodically.

When the electronic tax return is populated and completed by the logic agent 410 or by the direction of the logic agent 410 or using one or more components or services 470 as applicable, the electronic tax return can be printed and/or filed with a tax authority such federal state or local tax authority or other tax collecting entity such as Internal Revenue Service and Franchise Tax Board of the State of California.

Figure 17:
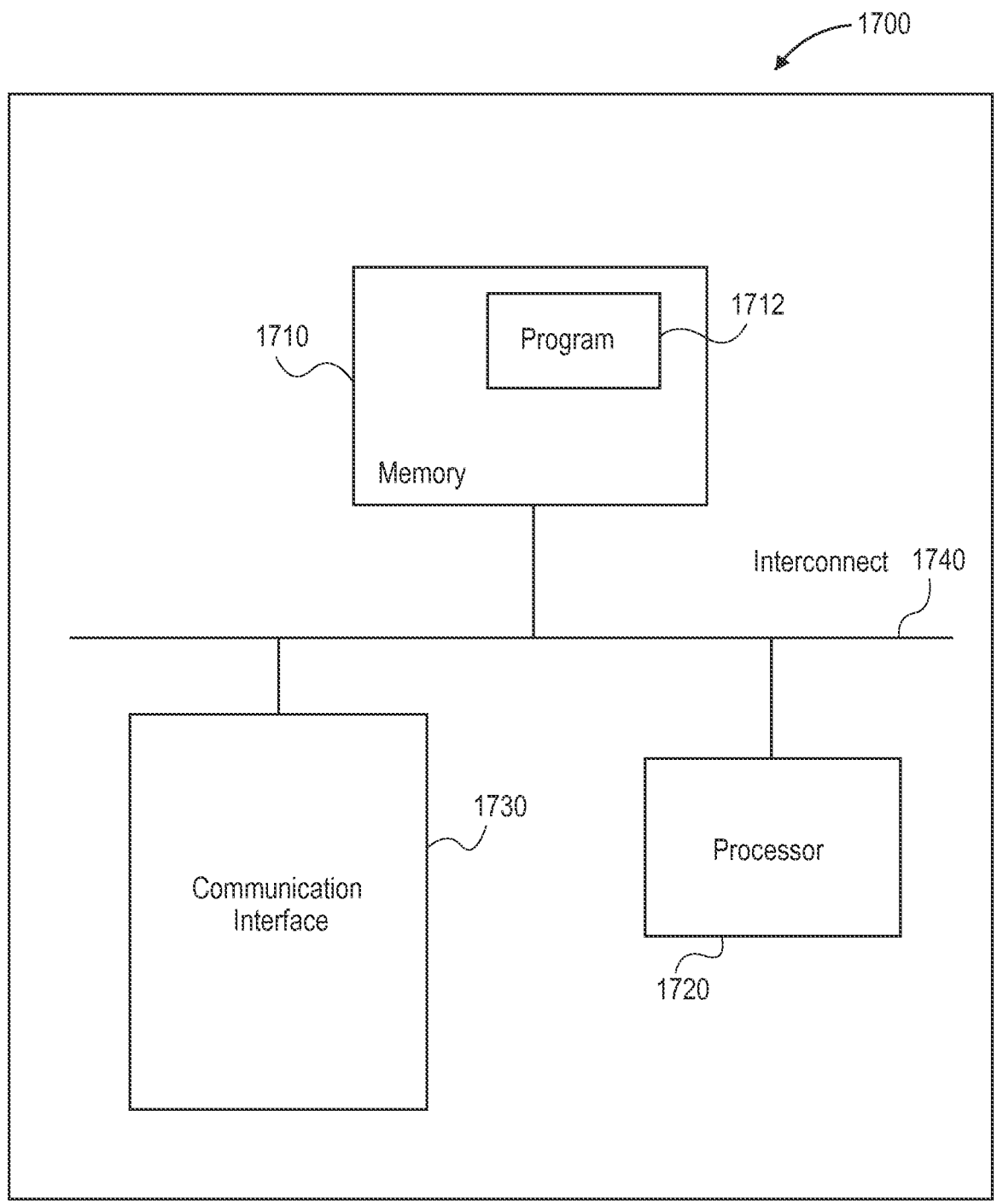
FIG. 17 is a block diagram of components of a system constructed according to another embodiment for performing semantic dependency resolution.

FIG. 17 generally illustrates certain components of a computing device 1700 that may be utilized to execute or that may embody components of embodiments. For example, the computing device may include a memory 1710, program instructions 1712, a processor or controller 1720 to execute instructions 1712, a network or communications interface 1730, e.g., for communications with a network or interconnect 1740 between such components. The memory 1710 may be or include one or more of cache, RAM, ROM, SRAM, DRAM, RDRAM, EEPROM and other types of volatile or non-volatile memory capable of storing data. The processor unit 1720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an Ethernet interface, a Frame Relay interface, or other interface. The network interface 1730 may be configured to enable a system component to communicate with other system components across a network which may be a wireless or various other networks. It should be noted that one or more components of computing device 1700 may be located remotely and accessed via a network. Accordingly, the system configuration provided in FIG. 17 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1720 performs steps or executes program instructions 1712 within memory 1710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method, comprising:

a computing device comprising a processor executing programmed instructions of a computerized tax return preparation application to prepare an electronic tax return, the computerized tax return preparation application comprising a shared data store in communication with a modular user interface controller, a modular rule-based logic agent and a modular tax calculation engine;

the modular user interface controller receiving respective first and second inputs related to respective first electronic tax return data and second electronic tax return data for the same element of a schema of the shared data store, generating a first instance identifier and a second instance identifier different than the first instance identifier for respective first and second electronic tax return data, and writing the first and second electronic tax return data and the first and second instance identifiers to the shared data store, a first instance for the first electronic tax return data being generated from the schema element and identified by the first instance identifier and stored in the shared data store as first instance data, and a second instance for the second electronic tax return data being generated from the same schema element and identified by the second instance identifier and stored in the shared data store as second instance data;

the modular calculation engine reading, from the shared data store, the first instance data and the second instance data and the first and second instance identifiers, executing a first calculation with the first instance data and generating a first result, and executing a second calculation with the second instance data and generating a second result, writing, to the shared data store, the first result as the first instance data identified by the first instance identifier, and writing the second result as the second instance data identified by the second instance identifier;

the modular rule-based logic agent reading, from the shared data store, the first instance data comprising the first result generated by the modular calculation engine and the second instance data comprising the second result generated by the modular calculation engine and the first and second instance identifiers, selecting a first question or tax topic based at least in part upon the read first instance data and rules of a decision table utilized by the modular rule-based logic agent, selecting a second question or tax topic of the decision table based at least in part upon the read second instance data and rules utilized by the modular rule-based logic agent, generating a first non-binding suggestion comprising the first question or tax topic and the read first instance identifier, generating a second non-binding suggestion comprising the second question or tax topic and the read second instance identifier and providing the first non-binding suggestion and the second non-binding suggestion to the modular user interface controller, the modular user interface controller receiving the first and second non-binding suggestions and generating an interview screen that is presented to a user of the tax return preparation application through a display of the computing device, the modular user interface controller being configured to determine which non-binding suggestions generated by the modular rule-based logic agent are used to present questions on the interview screen, and the tax return preparation application synchronizing electronic tax return data between the computing device and another computing device utilizing at least one of the first and second instance identifiers generated by the modular user interface controller and written to the shared data store.

2. The method of claim 1, the modular user interface controller generating at least one of the first instance identifier and the second instance identifier in response to the modular interface controller receiving a request by a user of the computerized tax return preparation application to enter data into an electronic tax form of the electronic tax return.

3. The method of claim 1, the modular user interface controller generating at least one of the first instance identifier and the second instance identifier in response to the modular interface controller receiving an input comprising entry of data into a field of the interview screen generated by the modular user interface controller.

4. The method of claim 1, the modular user interface controller generating at least one of the first instance identifier and the second instance identifier in response to the modular interface controller receiving an input comprising the user clicking a pre-determined button or selecting a pre-determined field within the interview screen generated by the modular user interface controller.

5. The method of claim 1, the modular user interface controller generating at least one of the first instance identifier and the second instance identifier in response to the modular interface controller receiving an input comprising a request to import electronic tax return data from an electronic tax return of a prior tax year.

6. The method of claim 1, the modular user interface controller generating at least one of the first instance identifier and the second instance identifier in response to the modular user interface controller receiving an input comprising data of a prior year electronic tax return imported into the electronic tax return being prepared with the computerized tax return preparation application.

7. The method of claim 1, the modular user interface controller generating at least one the first instance identifier and the second instance identifier in response to the modular user interface controller receiving an input comprising a request to import electronic tax return data from an electronic file of a computerized financial management system.

8. The method of claim 1, the modular user interface controller generating at least one of the first instance identifier and the second instance identifier in response to the modular user interface controller receiving an input comprising data of an electronic file generated by a computerized financial management system imported into the electronic tax return being prepared.

9. The method of claim 1, the modular user interface controller generating at least one of the first instance identifier and the second instance identifier in response to the modular user interface controller receiving an input comprising manual entry of data into the interview screen generated by the modular user interface controller.

10. The method of claim 1, at least one of the first instance identifier and the second instance identifier generated by the modular user interface controller comprising a random identifier generated by the modular user interface controller.

11. The method of claim 1, the random identifier comprising a randomly generated number.

12. The method of claim 1, at least one of the first instance identifier and the second instance identifier generated by the modular user interface controller comprising a universally unique identifier (UUID).

13. The method of claim 1, the first instance identifier generated by the modular user interface controller comprising a first identifier type and the second instance identifier generated by the modular user interface controller comprising a second identifier type different than the first identifier type.

14. The method of claim 13, the first instance identifier comprising a universally unique identifier (UUID) and the second identifier comprising an identifier type that is not UUID.

15. The method of claim 14, wherein the second instance identifier is a randomly generated identifier.

16. The method of claim 1, the first instance identifier and the second instance identifier generated by the modular user interface controller comprising the same type of instance identifier.

17. The method of claim 1, the first and second instance identifiers generated by the modular user interface controller both being universally unique identifiers (UUIDs).

18. The method of claim 1, the first and second instance identifiers generated by the modular user interface controller incorporating respective first time stamp data and second timestamp data different than the first timestamp data.

19. The method of claim 1 the first and second instance identifiers generated by the modular user interface controller incorporating respective first time stamp data and second timestamp data different than the first timestamp data and an identifier of a hardware component of the computing device utilized to generate respective first and second timestamp data.

20. The method of claim 1, the first and second instance identifiers generated by the modular user interface controller incorporating respective first and second encoded electronic tax return data.

21. The method of claim 1, wherein the modular rule-based logic agent selects a question or tax topic by:
   accessing the decision table specifying a plurality of rules and a plurality of questions and respective answers to respective questions, wherein whether a rule of the decision table applies is based at least in part upon an answer to at least one question in the decision table;
   eliminating or disabling at least one rule of the decision table based at least in part upon the data read from the shared data store that is an answer to a question in the decision table; and
   selecting a question or tax topic of the decision table based at least in part upon remaining questions of the decision table, wherein the non-binding suggestion includes the selected question or tax topic.

22. The method of claim 1, wherein the first instance identifier and the second instance identifier generated by the modular user interface controller and subsequently processed by the calculation engine and the modular rule-based logic agent are circulated back to the modular user interface controller as part of one or more non-binding suggestions generated by the modular rule-based logic agent regarding a question or tax topic derived from a decision table.

23. The method of claim 1, wherein synchronizing comprises the computing device transmitting the first electronic tax return data and the first instance identifier to the other computing device to synchronize electronic tax return data on each of the computing devices using the first instance identifier.

24. The method of claim 1, wherein synchronizing comprises the computing device receiving the electronic tax return data and the first instance identifier from the other computing device and updating the first instance data with data received from the other computing device utilizing the received first instance identifier.

25. The method of claim 1, wherein synchronizing comprises the computing device receiving third electronic tax return data and a third instance identifier from another computing device to synchronize electronic tax return data on each of the computing devices based at least in part upon the third instance identifier.

26. The method of claim 1, wherein the first and second instance identifiers are generated by the modular user interface controller before and independently of generation of the first and second instances.

27. The method of claim 1, further comprising the computing device transforming or converting a question-and-answer flow into a directed graph and converting the directed graph into the decision table.

28. The method of claim 27, wherein a rule is defined by a row of the decision table and a question is defined by a column of the decision table, and the modular rule-based logic agent determines which questions of the decision table remain unanswered based at least in part on rules defined by the rows and runtime data read from the shared data store.

29. The method of claim 27, the directed graph comprising a beginning node, a termination node, a plurality of intermediate nodes, and a plurality of respective arcs, at least one arc being between the beginning node and at least one intermediate node, at least one arc being between the termination node and at least one intermediate node, and at least one arc being between different intermediate nodes, wherein respective beginning and intermediate nodes correspond to respective questions and respective arcs correspond to respective answers to respective questions.

* * * * *